(12) United States Patent
Fujisawa et al.

(10) Patent No.: US 7,040,768 B2
(45) Date of Patent: May 9, 2006

(54) LIGHT SOURCE UNIT, ILLUMINATION OPTICAL DEVICE, PROJECTOR, AND METHOD OF MANUFACTURING LIGHT SOURCE UNIT

(75) Inventors: Shohei Fujisawa, Nagano-ken (JP); Takeshi Takezawa, Matsumoto (JP); Hiroyuki Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 10/849,877

(22) Filed: May 21, 2004

(65) Prior Publication Data
US 2005/0036318 A1 Feb. 17, 2005

(30) Foreign Application Priority Data
May 22, 2003 (JP) .............................. 2003-145116

(51) Int. Cl.
*F21V 7/00* (2006.01)
(52) U.S. Cl. .......................... 353/99; 313/113; 362/298
(58) Field of Classification Search .................. 353/98, 353/99, 119, 122, 31, 34, 37; 313/113, 114; 349/5, 6, 7, 8; 362/297, 298, 304, 346
See application file for complete search history.

(56) References Cited

U.S. PATENT DOCUMENTS

| | | | |
|---|---|---|---|
| 5,192,962 A * | 3/1993 | Nishida et al. | 353/98 |
| 5,491,525 A * | 2/1996 | Yamasaki et al. | 353/98 |
| 6,300,717 B1 | 10/2001 | Ooms | |
| 2004/0246451 A1 * | 12/2004 | Fujisawa et al. | 353/98 |
| 2004/0246452 A1 * | 12/2004 | Fujisawa et al. | 353/99 |
| 2005/0036318 A1 * | 2/2005 | Fujisawa et al. | 362/297 |
| 2005/0128440 A1 * | 6/2005 | Akiyama | 353/99 |
| 2005/0190560 A1 * | 9/2005 | Katsuma | 362/298 |
| 2005/0213054 A1 * | 9/2005 | Takezawa et al. | 353/99 |
| 2005/0213327 A1 * | 9/2005 | Kobayashi et al. | 362/261 |

FOREIGN PATENT DOCUMENTS

| | | |
|---|---|---|
| JP | 05-313117 | 11/1993 |
| JP | 08-031382 | 2/1996 |
| JP | A 9-120067 | 5/1997 |
| JP | 10-162627 | 6/1998 |
| JP | 10-311962 | 11/1998 |

* cited by examiner

*Primary Examiner*—William C. Dowling
(74) *Attorney, Agent, or Firm*—Oliff & Berridge, PLC

(57) ABSTRACT

Exemplary embodiments of the present invention include a light source unit in which lowering of an illumination intensity of an emitted luminous flux is reduced or prevented. A light source lamp unit includes a light source lamp having a light emitting section in which discharging emission is performed between electrodes, an elliptic reflector to emit a luminous flux radiated from the light source lamp in a certain uniform direction, and a secondary reflecting mirror provided on the opposite side of the light source lamp opposite from the elliptic reflector. A center of light emission C2 between the electrodes does not match a first focal point F1 of the elliptic reflector, a center of the source of reflected light C1 of the secondary reflecting mirror does not match the first focal point F1 of the elliptic reflector. The center of light emission C2, the first focal point F1, and the center of the source of reflected light C1 are disposed on a straight line perpendicular to a straight line connecting the first focal point F1 and a second focal point F2 of the elliptic reflector.

18 Claims, 12 Drawing Sheets

LIGHT SOURCE UNIT, ILLUMINATION OPTICAL DEVICE, PROJECTOR, AND METHOD OF MANUFACTURING LIGHT SOURCE UNIT

BACKGROUND OF THE INVENTION

1. Field of Invention

The present invention relates, for example, to a light source unit including an arc tube having a light emitting section in which discharging emission between electrodes is carried out, a first reflecting mirror to emit a luminous flux radiated from the arc tube in a certain uniform direction, and a second reflecting mirror provided on the opposite side of the light emitting section from the first reflecting mirror, an illuminating optical device, a projector, and a method of manufacturing the light source unit.

2. Description of Related Art

In the related art, for example, in an illuminating device provided with an arc tube having a light emitting section and a first reflecting mirror injecting a luminous flux radiated from the light emitting section in a certain uniform direction, a second reflecting mirror is provided at the position opposite side of the arc tube from the first reflecting mirror so that light, which has been radiated from the arc tube but has become stray light and hence has not been used, can be used efficiently, as shown in related art document JP-A-8-31382.

In such an illuminating device, a high degree of accuracy is required to adjust the relative position among the arc tube, the first reflecting mirror and the second reflecting mirror in order to obtain the brightness of a luminous flux emitted from the illuminating device, and the position of a focusing point at desired values.

SUMMARY OF THE INVENTION

Exemplary embodiments of the present invention include a light source unit, an illuminating optical device, a projector in which lowering of illumination intensity of an emitted light flux is reduced or prevented, and a method of manufacturing the light source unit.

A light source unit according to exemplary embodiments of the present invention is a light source unit including an arc tube having a light emitting section in which discharging emission is performed between electrodes, a first reflecting mirror to emit a luminous flux radiated from the arc tube in a certain uniform direction, and a second reflecting mirror provided on the opposite side of the light emitting section from the first reflecting mirror, the first reflecting mirror including a reflecting surface in the form of an oval curved surface. According to exemplary embodiments, the reflecting surface of the first reflecting mirror has a first focal point and a second focal point, the center of discharging emission between the electrodes does not match the first focal point of the first reflecting mirror, the center of the source of reflected light from the second reflecting mirror formed by the luminous flux emitted from the center of discharging emission between the electrodes and reflected from the second reflecting mirror does not match the center of discharging emission between the electrodes and the first focal point of the first reflecting mirror. The center of discharging emission between the electrodes, the first focal point of the first reflecting mirror, and the center of the source of reflected light from the second reflecting mirror are aligned on a straight line perpendicular to a straight line connecting the first focal point and the second focal point of the first reflecting mirror.

According to the above-described configuration of the present invention, since the center of discharging emission between the electrodes does not match the center of the source of reflected light on the second reflecting mirror, the luminous flux reflected from the second reflecting mirror can proceed to the first reflecting mirror while being hardly subjected to plasma absorption by an arc source between the electrodes, whereby illumination intensity of an arc image formed after being reflected via the second reflecting mirror and the first reflecting mirror may further be enhanced or improved.

In exemplary embodiments of the present invention, preferably, the first focal point of the first reflecting mirror is disposed on the straight line perpendicular to the straight line connecting the first focal point and the second focal point of the first reflecting mirror between the center of discharging emission between the electrodes and the center of the source of reflected light from the second reflecting mirror.

Accordingly, since the first focal point of the first reflecting mirror, the center of discharging emission between the electrodes, and the center of the source of reflected light from the second reflecting mirror are disposed on the straight line perpendicular to the straight line connecting the first focal point and the second focal point of the first reflecting mirror, and since the first focal point of the first reflecting mirror is disposed between the center of discharging emission between the electrodes and the center of the source of reflected light from the second reflecting mirror, the luminous flux may be converged at the position in the vicinity of the second focal point of the first reflecting mirror, and hence the illumination intensity of the luminous flux emitted from the light source unit may be enhanced or improved.

According to exemplary embodiments of the present invention, preferably, the first focal point of the first reflecting mirror is arranged at the position closer to the center of discharging emission between the electrodes than to the center of the source of reflected light from the second reflecting mirror.

Since the first focal point of the first reflecting mirror disposed between the center of the source of reflected light from the second reflecting mirror and the center of discharging emission between the electrodes is arranged at the position closer to the center of discharging emission than to the center of the source of reflected light, a first arc image formed by the luminous flux emitted from the center of discharging emission, which has more light amount than at the center of the source of reflected light can be formed at the position in the vicinity of the second focal point of the first reflecting mirror, the luminous flux mainly containing the first arc image having large amount of light can be emitted toward an object to be illuminated by the light source unit.

In exemplary embodiments of the present invention, preferably, the second reflecting mirror is formed by depositing a reflecting material on the front surface of the light emitting section.

According to the above-described configuration of the present invention, since the second reflecting mirror can be formed easily, the light source unit can be manufactured easily.

An illuminating optical device of the present invention is an illuminating optical device including: a light source unit having an arc tube having a light emitting section in which discharging emission is performed between electrodes. The optical device further includes a first reflecting mirror to emit a luminous flux radiated from the arc tube in a certain uniform direction, and a second reflecting mirror provided on the opposite side of the light emitting section from the first reflecting mirror, and a polarized light converting optical system to emit the luminous flux emitted from the light source unit as one type of linearly polarized optical flux in a certain uniform direction. The polarized light converting optical system includes a plurality of elongated polarized light separating films to separate an incoming luminous flux into two linearly polarized luminous fluxes and a plurality of reflecting films interposed between the polarized light separating films. The light source unit is any one of above-described light source units and the direction of displacement between the center of discharging emission between the electrodes and the center of the source of reflected light from the secondary reflecting mirror is parallel to the longitudinal direction of the polarized light separating films.

According to the above-described configuration of exemplary embodiments of the present invention, since the direction of displacement between the center of discharging emission between the electrodes and the center of the source of reflected light from the second reflecting mirror of the light source unit is parallel to the longitudinal direction of the polarized light separating films of the polarized light converting optical system, even when the first arc image and a second arc image of the luminous flux emitted from the light source unit are displaced, there is little or no difference in light amount of the luminous flux coming into the polarized light separating film of the polarized light converting optical system from the case in which the first arc image and the second arc image are not displaced. Therefore, loss of light amount of illumination emitted from the illuminating optical device due to displacement between the center of discharging emission between the electrodes and the center of the source of reflected light from the second reflecting mirror may be reduced or prevented, whereby illumination of higher intensity may be emitted.

The projector according to exemplary embodiments of the present invention is characterized in that the aforementioned light source unit or the aforementioned illuminating light optical system is provided.

According to the projector of the present invention, the same or similar effects as the effects of the aforementioned light source unit or the illuminating optical device may be achieved.

A method of manufacturing a light source unit according to exemplary embodiments of the present invention is a method of manufacturing a light source unit including: an arc tube having a light emitting section in which discharging emission is performed between electrodes, a first reflecting mirror to emit a luminous flux radiated from the arc tube in a certain uniform direction, and a second reflecting mirror provided on the opposite side of the light emitting section from the first reflecting mirror. The method further includes adjusting the position of the second reflecting mirror with respect to the arc tube so that the electrodes and the reflected image of the electrodes reflected from the second reflecting mirror are displaced; fixing the second reflecting mirror adjusted in position with respect to the arc tube to the arc tube; and arranging the first reflecting mirror so that the first focal point and the second focal point of the first reflecting mirror are disposed on a reference axis on a luminous flux incoming side of a collimator lens of an optical system. The optical system includes the collimator lens to make parallel the luminous flux radiated from the arc tube disposed on the reference axis, a luminous flux splitting optical element to split the luminous flux emitted from the collimator lens into a plurality of partial luminous fluxes and an imaging element to image the luminous flux split by the luminous flux splitting optical element at a predetermined position. The optical system further includes a polarized light converting optical system provided with an elongated polarized light separating film to align the polarizing direction of the respective partial luminous fluxes split by the luminous flux splitting optical element into a certain uniform direction, and a projecting screen on which an image formed by the imaging element is projected. The method further includes illuminating the arc tube provided with the second reflecting mirror and projecting a first arc image formed by the luminous flux radiated from the light emitting section reflected directly from the first reflecting mirror and a second arc image formed by the luminous flux radiated from the light emitting section and reflected from the first reflecting mirror via the second reflecting mirror on the projecting screen; adjusting the position of the arc tube on which the second reflecting mirror is fixed with respect to the first reflecting mirror in the direction parallel to the reference axis and in the direction perpendicular to the reference axis so that the brightness of the first arc image and the second arc image projected on the projecting screen is maximized. The method further includes rotating the arc tube with respect to the first reflecting mirror so that the direction of displacement between the center of the first arc image and the center of the second arc image is in the direction parallel to the longitudinal direction of the polarized light separating films, and adjusting the position of the arc tube on which the second reflecting mirror is fixed with respect to the first reflecting mirror; and fixing the arc tube adjusted in position with respect to the first reflecting mirror to the first reflecting mirror.

According to the above-described configuration of exemplary embodiments of the present invention, since the position of the arc tube with respect to the first reflecting mirror is adjusted in the direction parallel to the reference axis and in the direction perpendicular to the reference axis so that the maximum brightness of the first arc image and the second arc image is achieved, and the position of the arc tube with respect to the first reflecting mirror is adjusted so that the direction of displacement between the center of the first arc image and the center of the second arc image is in the direction parallel to the longitudinal direction of the polarized light separating film of the polarized light converting optical system while observing the first arc image and the second arc image projected on the projecting screen, the light source unit, which can emit illumination of high intensity, may be manufactured with high degree of accuracy.

In addition, since the second reflecting mirror is mounted to the arc tube, and the relative position between the first reflecting mirror and the arc tube on which the second reflecting mirror is fixed is adjusted by rotating the arc tube, adjustment requires rotation of a light source lamp 11 and not necessary to change the posture of the first reflecting mirror. Accordingly, the light source unit for emitting the illumination of high intensity may be manufactured easily. Also, since it is not necessary to change the posture of the elliptic reflector 12 for adjustment, the shape of an elliptic reflector 12 may be the shape which can hardly be rotated, such as a square shape in cross-section at the portion near an opening, whereby versatility is increased.

Another method of manufacturing the light source unit according to exemplary embodiments of the present invention is a method of manufacturing a light source unit including an arc tube having a light emitting section in which discharging emission is performed between electrodes, a first reflecting mirror to emit a luminous flux radiated from the arc tube in a certain uniform direction, and a second reflecting mirror provided on the opposite side of the light emitting section from the first reflecting mirror. The method includes adjusting the position of the second reflecting mirror with respect to the arc tube so that the electrodes and a reflected image of the electrodes reflected from the second reflecting mirror are displaced; fixing the second reflecting mirror, which is adjusted in position with respect to the arc tube, to the arc tube; disposing the first reflecting mirror on the luminous flux incoming side of the collimator lens of an optical system so that the first focal point and the second focal point of the first reflecting mirror are disposed on the reference axis. The optical system includes a collimator lens to make parallel the luminous flux radiating from the arc tube, a luminous flux splitting optical element to split the luminous flux emitted from the collimator lens into a plurality of partial luminous fluxes, and an imaging element to image the luminous fluxes split by the luminous flux splitting optical element at a predetermined position. The method further includes a polarized light converting optical system to convert the direction of polarized light of the respective partial luminous fluxes split by the luminous flux splitting optical element and being provided with an elongated polarized light separating film, a superimposing lens to superimpose the luminous flux emitted from the polarized light converting optical system onto an illuminating area which is the object to be illuminated by the light source device, a frame member having an opening of a shape corresponding to the range of illuminating area, and an illuminance meter to measure the illumination intensity of the luminous flux emitted from the opening of the frame member. The method further includes adjusting a position of the arc tube including the second reflecting mirror fixed thereon with respect to the first reflecting mirror in the direction parallel to the reference axis and in the direction perpendicular to the reference axis so that the illumination intensity of the luminous flux emitted from the opening of the frame member becomes higher while applying a voltage to the arc tube to allow it to illuminate and measuring the illumination intensity of the luminous flux emitted from the opening of the frame member with the illuminance meter. The method further includes adjusting the position of the arc tube including the second reflecting mirror fixed thereon with respect to the first reflecting mirror by rotating the arc tube with respect to the first reflecting mirror so that the illumination intensity of the luminous flux emitted from the opening of the frame member becomes higher while measuring the illumination intensity of the luminous flux emitted from the opening of the frame member with the illuminance meter; and fixing the arc tube on which the second reflecting mirror positioned with respect is fixed to the first reflecting mirror to the first reflecting mirror.

According to the above-described configuration of exemplary embodiments of the present invention, the position of the arc tube, on which the second reflecting mirror is fixed, is adjusted with respect to the first reflecting mirror so that the illumination intensity of the luminous flux emitted from the opening of the frame member having the same shape as the shape of the illuminating area, which is the object to be illuminated by the luminous flux emitted from the light source unit becomes higher. Accordingly, the light source unit, which emits the illumination of higher illumination intensity to the illuminating area which is the object to be illuminated by the light source unit, may be manufactured easily.

DETAILED DESCRIPTION OF PREFERRED EMBODIMENTS

Figure 1:
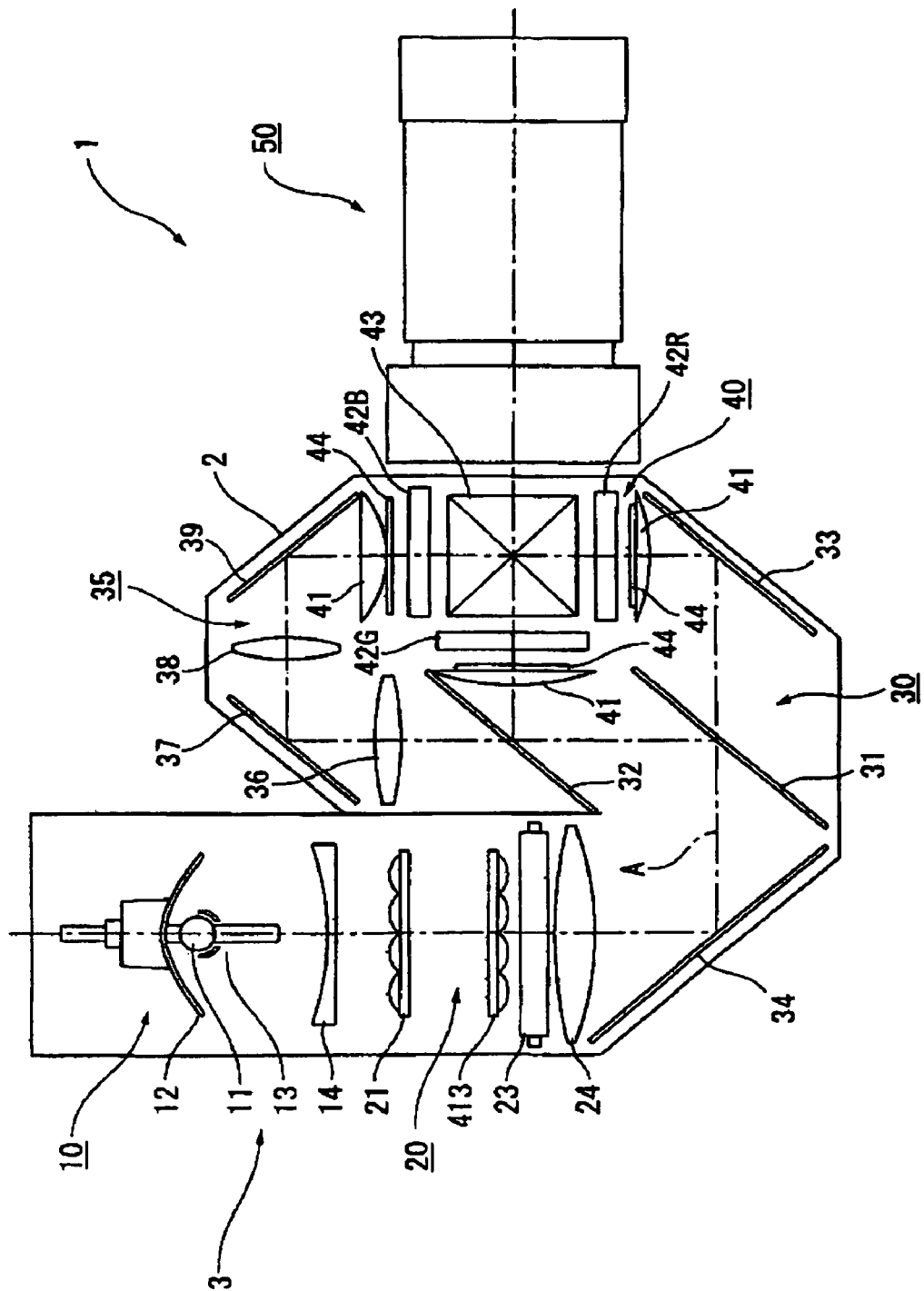
FIG. 1 is a schematic that shows an optical system of a projector 1 in which a light source unit and an illuminating optical device according to an exemplary embodiment of the present invention is applied.

Referring to the drawings, the respective embodiments of the present invention will be described.

[First Exemplary Embodiment]

FIG. 1 is a schematic that shows a diagram of an optical system of a projector 1 to which an illuminating optical device according to a first exemplary embodiment of the present invention is applied.

The projector 1 is an optical apparatus for forming an optical image by modulating a luminous flux emitted from a light source according to image information and projecting on a screen in an enlarged manner. The optical apparatus includes a light source lamp unit 10 as a light source unit, a uniformly illuminating optical system 20, a color separating optical device 30, a relay optical device 35, an optical device 40, and a projecting lens 50. An optical element constituting the optical systems 20–35 is positioned and stored in an optical component enclosure 2 having a predetermined reference axis A.

The light source lamp unit 10 and the uniformly illuminating optical system 20 constitute an illuminating optical device 3.

The light source lamp unit 10 emits a luminous flux radiated from a light source lamp 11 in a certain uniform direction to illuminate the optical device 40, and includes the light source lamp 11, an elliptic reflector 12, a secondary reflecting mirror 13, and a collimator concave lens 14, though details are described later.

By using the secondary reflecting mirror 13 as described above, since the luminous flux radiated from the light source lamp 11 to the opposite direction from the elliptic reflector 12 (forward direction) is reflected toward the elliptic reflector 12 (rearward direction) by the secondary reflecting mirror 13, even when an oval curved surface on the front side of the elliptic reflector 12 is small, most of the luminous flux emitted from the light source lamp 11 may be guided into the elliptic reflector 12 to emit in a certain uniform direction, so that the dimension of the elliptic reflector 12 in the direction of the optical axis may be reduced.

The length of the elliptic reflector 12 in the direction of the optical axis is smaller than the length of the light source lamp 11. When the light source lamp 11 is mounted to the elliptic reflector 12, part of the light source lamp 11 protrudes from a luminous flux emitting port on the elliptic reflector 12.

The luminous flux emitted as convergent rays from the elliptic reflector 12 uniformly in the forward direction of the device is made parallel by the collimator concave lens 14 and is guided into the uniformly illuminating optical system 20.

The light source lamp unit 10 is detachably attached to the optical component enclosure 2 and may be replaced when the light source lamp 11 is broken, or is deteriorated in brightness due to its lifetime.

The uniformly illuminating optical system 20 is an optical system to split the luminous flux emitted from the light source lamp unit 10 into a plurality of partial luminous fluxes and make uniform the illumination intensity within a plane of an illuminating area, and includes a first lens array 21, a second lens array 413, a polarized light converting optical system 23, and a superimposing lens 24.

The first lens array 21 has a function as a luminous flux splitting optical element to split the luminous flux emitted from the light source lamp unit 10 into a plurality of partial luminous fluxes, and includes a plurality of small lenses arranged in a matrix manner in the plane orthogonal to the reference axis A, and the contour shape of each small lens is substantially similar to the shapes of image forming areas of liquid crystal panels 42R, 42G, and 42B constituting the optical device 40, described later.

The second lens array 413 is an optical element to converge the plurality of partial luminous fluxes split by the aforementioned first lens array 21 together with the superimposing lens 24, and includes a plurality of small lenses 221 arranged in a matrix manner in a plane orthogonal to the reference axis A as in the case of the first lens array 21. For example, four rows and six columns of small lenses 221 are arranged in a plane orthogonal to the reference axis A. The second lens array 413 is intended to converge light, the contour shape of each small lens is not required to correspond to the shapes of the image forming area of the liquid crystal panels 42R, 42G, and 42B.

The polarized light converting optical system 23 is to align the directions of the polarized light of the respective partial luminous fluxes split by the first lens array 21 into a certain uniform direction in the form of linearly polarized light, and includes a polarized light converting element 61 and a light-shielding plate 62. By using such a polarized light converting optical system 23, the luminous efficiency of light from the light source used by the optical device 40 may be enhanced or improved.

The superimposing lens 24 is an optical element for converging the plurality of partial luminous fluxes passed through the first lens array 21, the second lens array 413, and the polarized light converting optical system element 23 and superimposing them onto the illuminating area, which is the image forming areas of the liquid crystal panels 42R, 42G, and 42B. The superimposing lens 24 in this example is a spherical lens. However, an aspherical lens may also be used.

The color separating optical device 30 includes two dichroic mirrors 31 and 32, and reflecting mirrors 33 and 34 and separates the plurality of partial luminous fluxes emitted from the uniformly illuminating optical system 20 into light of three colors of red (R), green (G), and blue (B) by the dichroic mirrors 31, 32.

The luminous flux emitted from the superimposing lens 24 is redirected on the reflecting mirror 34 and emitted toward the dichroic mirrors 31 and 32.

The dichroic mirrors 31, 32 each are an optical element formed with a wavelength selecting film which reflects a luminous flux of a predetermined certain range of wavelength and transmits a luminous flux of other wavelength on a base plate. The dichroic mirror 31 to be disposed on the upstream of an optical path is a mirror which transmits red light and reflects light in other colors. The dichroic mirror 32 disposed on the downstream of the optical path is a mirror which reflects green light and transmits blue light.

The relay optical device 35 includes an incoming side lens 36, a relay lens 38, and reflecting mirrors 37 and 39, and has a function to guide blue light passed through the dichroic mirror 32 constituting the color separating optical device 30 to the optical device 40. One of the reasons why the relay optical device 35 is provided in the optical path of blue light is to prevent or reduce lowering of the luminous efficiency of light due to divergence of light since the optical path of blue light is longer than the optical paths of light in other colors in this example. Although the relay optical device 35 is adapted to pass blue light out of three colors of lights when the optical path of red light is long, an arrangement to pass light in other colors such as red light is also applicable.

Red light separated from the above-described dichroic mirror 31 is redirected by the reflecting mirror 33 and supplied to the optical device 40 via a field lens 41. Green light separated by the dichroic mirror 32 is supplied to the optical device 40 via the field lens 41 as is. Further, blue light is converged and redirected by the lenses 36, 38 which constitute the relay optical device 35 and the reflecting mirrors 37, 39 and supplied to the optical device 40 via the field lens 41. The field lens 41 provided on the upstream of the optical paths of light of the respective colors in the optical device 40, is provided to convert the respective partial luminous fluxes emitted from the second lens array 413 into a luminous flux parallel with reference axis A.

The optical device 40 forms a color image by modulating the incoming luminous flux according to image information, and includes the liquid crystal panels 42 as optical modulating units, which are object to be illuminated by the illuminating optical device 3, and a cross dichroic prism 43 as a color synthesis optical system. An incoming side polarizing plate 44 is interposed between the field lens 41 and the respective liquid crystal panels 42R, 42G, 42B, though it is now shown in the drawing, and an outgoing side polarizing plate is interposed between the respective liquid crystal panels 42R, 42G, 42B and the cross dichroic prism 43, whereby light modulation of incoming light of the respective colors is performed by the incoming side polarizing plate 44, the liquid crystal panels 42R, 42G, 42B, and the outgoing side polarizing plate.

The liquid crystal panels 42R, 42G, 42B each are formed by hermetically encapsulating liquid crystal, which is an electro-optical substance, into a pair of transparent glass plates, and for example, modulate the polarizing direction of the polarized luminous flux emitted from the incoming side polarizing plate 44 according to supplied image signals with a polysilicon TFT as a switching element. The image forming areas for modulating the liquid crystal panels 42R, 42G, and 42B are rectangular, and have a diagonal size of 0.7 inches for example.

The cross dichroic prism 43 is an optical element that forms a color image by synthesizing optical images which are modulated for each color of light emitted from the outgoing side polarizing plate. The cross dichroic prism 43 is formed by adhering four rectangular prisms and is substantially square in plan view. On the interfaces between the respective adjacent rectangular prisms, there are formed dielectric multi-layer films in substantially X-shape. One of dielectric multi-layer films of the X-shape reflects red light, and the other dielectric multi-layer film reflects blue light. Red light and blue light are redirected by the dielectric multi-layer films and directed into the same direction as green light, so that three colors are synthesized.

Then, the color image emitted from the cross dichroic prism 43 is enlarged and projected by the projecting lens 50 to form a big screen image on a screen, not shown.

1. Detailed Structure of Light Source Lamp Unit

Figure 2:
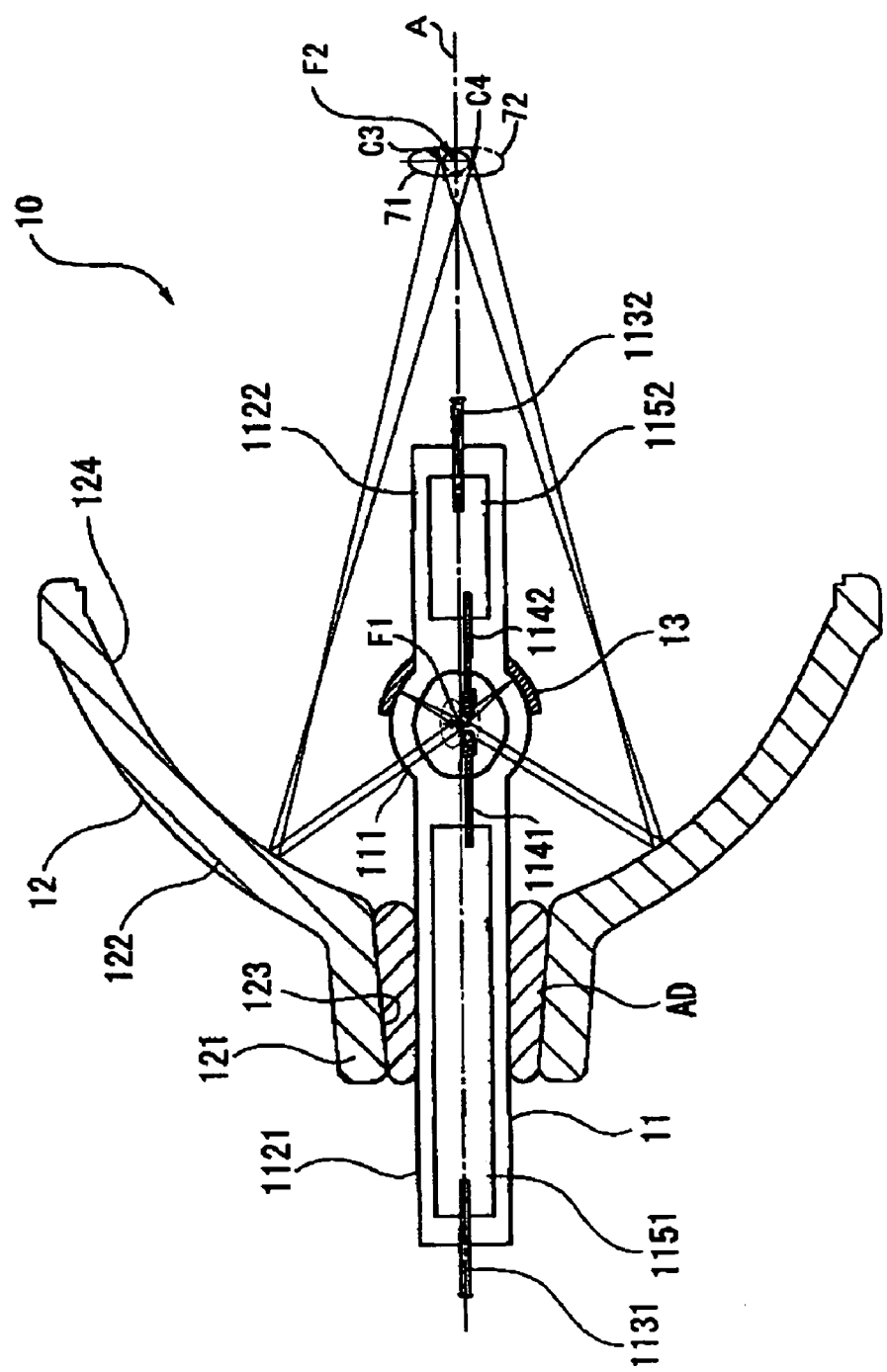
FIG. 2 is a schematic that shows an enlarged cross-sectional view of the light source unit according to the exemplary embodiment of the present invention.

FIG. 2 is a schematic that shows an enlarged cross-sectional view of the light source lamp unit 10.

The light source lamp unit 10 includes the light source lamp 11 as an arc tube having a light emitting section 111, the elliptic reflector 12 as a first reflecting mirror mounted to the light source lamp 11 for emitting the luminous flux in a certain uniform forward direction, and the secondary reflecting mirror 13 provided on the opposite side of the light emitting section 111 of the light source lamp 11 from the elliptic reflector 12 as a second reflecting mirror.

The light source lamp 11 is formed of a quartz glass tube swelling at the center into a spherical shape, and the center portion serves as a light emitting section 111, and the sections extending both sides of the light emitting section 111 are designated as sealed sections 1121, 1122.

The light source lamp 11 may be various arc tubes which emit light of high brightness, such as a metal halide lamp, a high-pressure mercury lamp, or a super high-pressure mercury lamp.

A pair of electrodes 1141, 1142 formed of tungsten disposed at a predetermined distance from each other, mercury, rare gas, and a small amount of halogen are encapsulated in the light emitting section 111.

Molybdenum metallic foils 1151, 1152 to be electrically connected to the electrodes 1141, 1142 of the light emitting section 111 are inserted into the sealed sections 1121, 1122, and are sealed by glass material or the like. The metallic foils 1151, 1152 are connected to lead wires 1131, 1132 as electrode leader lines, and the lead wires 1131, 1132 extend to the outside of the light source lamp 11.

When a voltage is applied to the lead wires 1131, 1132, an electrical discharge occurs between the electrodes 1141, 1142, then the light emitting section 111 is illuminated, and a luminous flux is radially emitted.

Though not shown in FIG. 2, it is also possible to wind a nichrome wire or the like, on the front sealed section 1122 of the light source lamp 11, distribute an electric current through the nichrome wire when activating the projector 1 to preheat the light emitting section 111. With the provision of such a preheating device, a halogen cycle in the light emitting section 111 is generated in an early stage, and hence the light source lamp 11 can be illuminated soon.

By applying a reflection preventing coating of multi-layer film including a tantalum oxide film, a hafnium oxide film, or titanium oxide film on the outer peripheral surface of the light emitting section 111, loss of light due to reflection of light passing therethrough can be reduced.

The elliptic reflector 12 is an integral glass mold provided with a neck portion 121 through which the rear sealed section 1121 of the light source lamp 11 is inserted, and a reflecting portion 122 in the form of an oval curved surface extending from the neck portion 121.

The neck portion 121 is formed with an insertion hole 123 at the center thereof. The light source lamp 11 is fixed to the elliptic reflector 12 by inserting the sealed section 1121 of the light source lamp 11 into the insertion hole 123 and filling inorganic adhesive agent AD therein.

A reflecting surface 124 as a cold mirror which reflects visual light and transmits infrared ray and UV ray is formed by depositing a metallic thin film on the inner surface of the reflecting portion 122.

As shown in FIG. 2, a first focal point F1 and a second focal point F2 of the reflecting surface 124 in the form of an oval curved surface are disposed on a reference axis A. A center C2 of light emission, which corresponds to the center between the electrodes 1141, 1142 of the light source lamp 11 disposed inside the reflecting portion 122, is displaced from the first focal point F1 of the reflecting surface 124 of the elliptic reflector 12 in the direction perpendicular to the reference axis A.

The secondary reflecting mirror 13 is a reflecting member covering substantially half the light emitting section 111 on the front side of the light source lamp 11. The sealed section 1122 is inserted into the secondary reflecting mirror 13 and the secondary reflecting mirror 13 is fixed to the sealed section 1222 with adhesive agent. The secondary reflecting mirror 13 is formed of inorganic material such as quartz or alumina ceramics, which is a material of low thermal expansion and/or a material of high thermal conductivity, and the reflecting surface thereof is formed into a concave curve, and formed into a cold mirror like the elliptic reflector 12.

Figure 3:
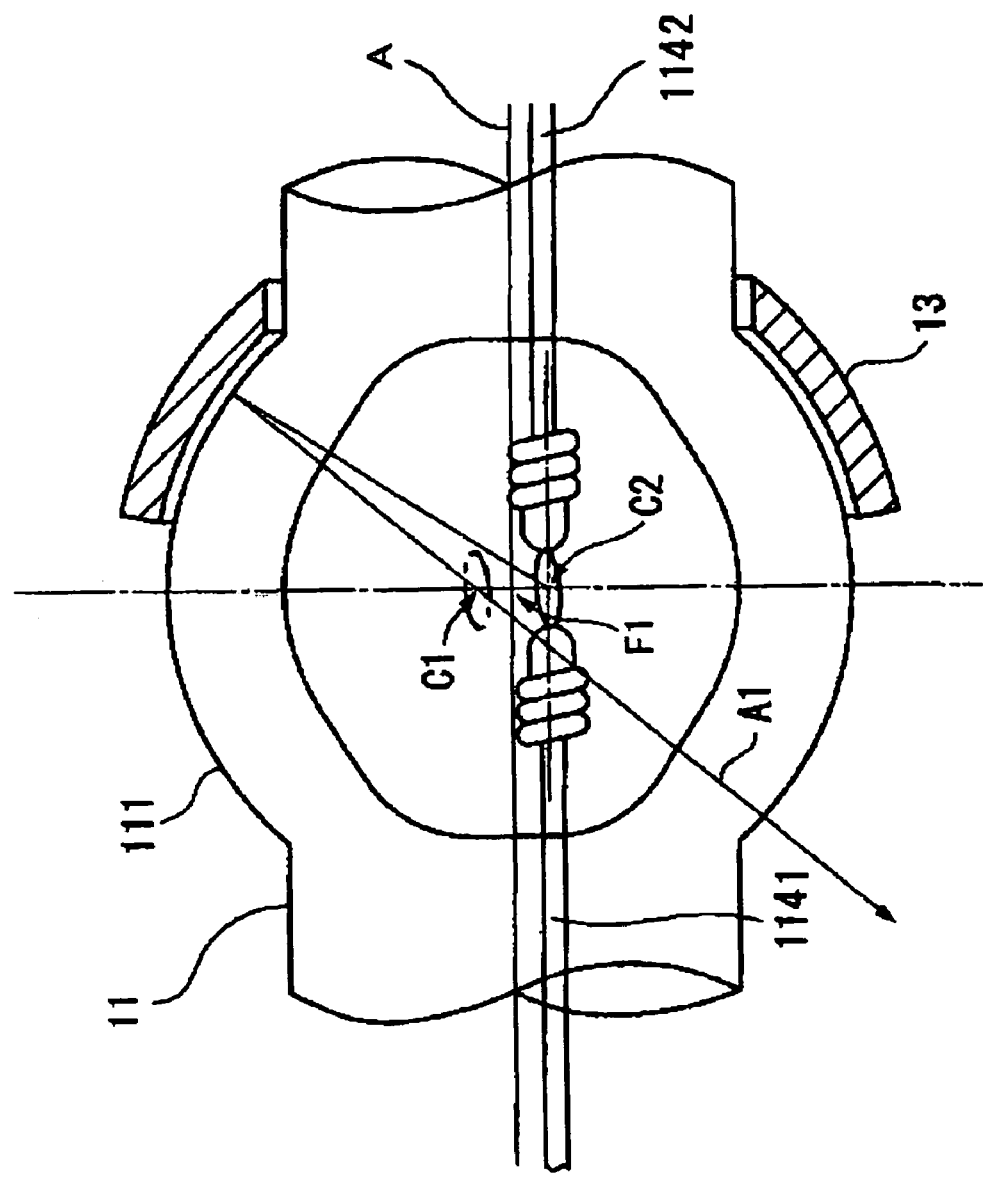
FIG. 3 is a schematic that shows an enlarged cross-sectional view of an arc tube according to the exemplary embodiment of the present invention.

As shown in FIG. 3, a luminous flux A1 radiated from the center C2 of light emission and reflected from the secondary reflecting mirror 13 does not return to the center C2 of light emission, but proceeds to a center C1 of the source of reflected light of the secondary reflecting mirror 13. The center C1 of the source of reflected light of the secondary reflecting mirror 13 is disposed on a straight line passing through the center C2 of light emission and perpendicular to the reference axis A.

The first focal point F1 of the elliptic reflector 12, the center C2 of light emission, and the center C1 of the source of reflected light of the secondary reflecting mirror 13 are disposed on the straight line perpendicular to the reference axis A, and the first focal point F1 is disposed between the center C1 of the source of reflected light and the center C2 of light emission. The amount of displacement between the center of the light source C2 and the center C1 of the source of reflected light is within the range in which the luminous flux emitted from the elliptic reflector 12 can effectively enter the collimator concave lens 14. In addition, the first focal point F1 is preferably located closer to the center C2 of light emission than to the center C1 of the source of reflected light.

Since the center C2 of light emission and the center C1 of the source of reflected light are displaced as described above, the luminous flux reflected from the secondary reflecting mirror 13 can proceed to the elliptic reflector 12 while being hardly subjected to plasma absorption by the arc source generated between the electrodes 1141, 1142, and is emitted from the light source lamp unit 10.

In the light source lamp unit 10 as described above, when a voltage is applied to the lead wires 1131, 1132, electric discharge occurs between the electrodes 1141, 1142, then the light emitting section 111 is illuminated, and the luminous flux is radially emitted from the center C2 of light emission of the light emitting section 111. As shown in FIG. 2, the luminous flux which is proceeded directly to the elliptic reflector 12 out of the luminous flux emitted from the center of the light emission C2 is reflected from the reflecting surface 124 of the elliptic reflector 12, and becomes convergent rays which converges to a first arc image 71. A center C3 of the first arc image 71 is displaced from the second focal point F2 of the elliptic reflector 12 in the direction opposite from the direction of displacement of the center C2 of light emission with respect to the first focal point F1 of the elliptic reflector 12.

On the other hand, the luminous flux emitted in the opposite direction from the elliptic reflector 12 (forward direction) out of the luminous flux emitted from the center C2 of light emission is reflected from the secondary reflecting mirror 13, passes through the center C1 of the source of reflected light, proceeds to the elliptic reflector 12, is reflected from the reflecting surface 124 of the elliptic reflector 12 again, and becomes convergent rays which converges to a second arc image 72. A center C4 of the second arc image 72 is displaced from the second focal point F2 of the elliptic reflector 12 in the opposite direction from the direction of displacement of the center of the source of the reflected light C1 of the secondary reflecting mirror 13 with respect to the first focal point F1 of the elliptic reflector 12.

2. Detailed Structure of the Polarized Light Converting Optical System

Figure 4:
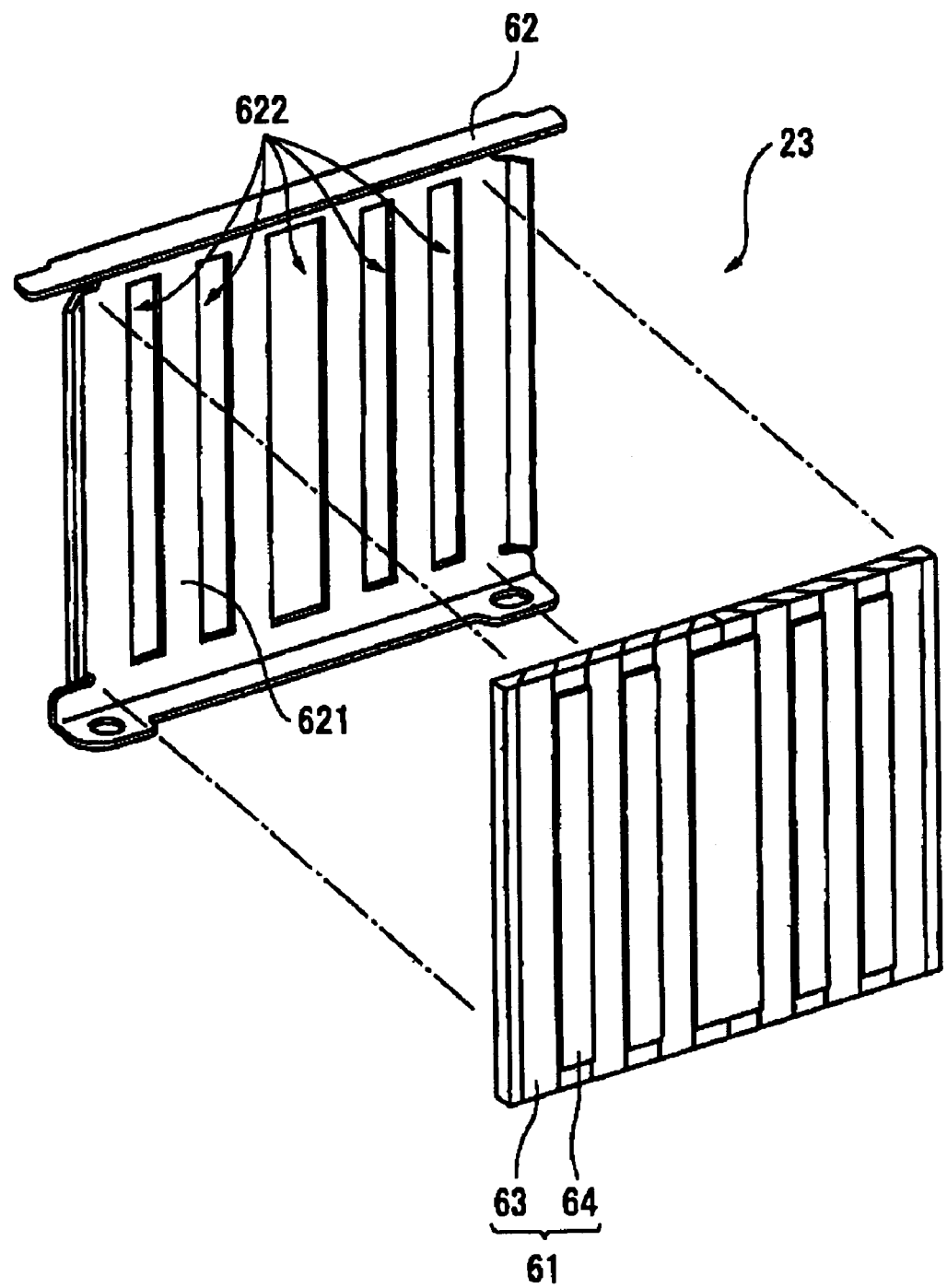
FIG. 4 is a schematic that shows an exploded perspective view of a polarized light converting optical system according to the exemplary embodiment of the present invention.
Figure 5:
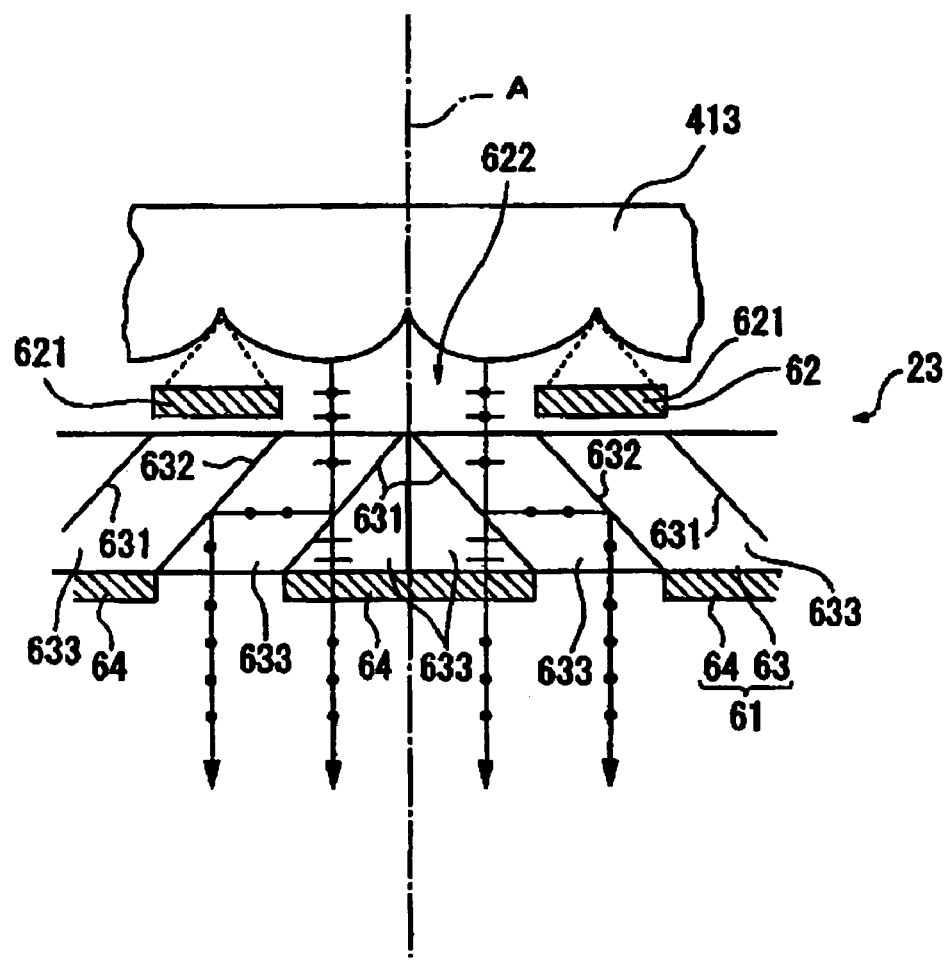
FIG. 5 is a schematic that shows a partly enlarged cross-sectional plan view of the polarized light converting optical system according to the exemplary embodiment of the present invention.

FIG. 4 is a schematic that shows an exploded perspective view of the polarized light converting optical system 23. FIG. 5 is a schematic that shows a partly enlarged cross-sectional view of the polarized light converting optical system 23.

The polarized light converting optical system 23 includes the polarized light converting element 61 that emits an incoming luminous flux emitted from the light source lamp unit 10, split into a plurality of partial luminous fluxes by the first lens array, and converged by the respective small lenses 221 of the second lens array 413 as one type of linearly polarized luminous flux, and the light-shielding plate 62 provided on the luminous flux incoming side of the polarized light converting element 61.

Here, the polarized light converting element 61 includes a plate-shaped polarized light separating element array 63 and a phase plate 64 adhered on the polarized light separating element array 63 on the luminous flux emitting side.

The polarized light separating element array 63 includes a plurality of polarized light separating films 631, a plurality of polarized light separating films 631 interposed between the polarized light separating films 631, and a glass member 633 formed with the polarized light separating film 631 and the reflecting film 632. The polarized light separating film 631 is disposed obliquely with respect to the incoming luminous flux, and separates the incoming luminous flux into two types of linearly polarized luminous fluxes. The reflecting film 632 reflects one of the linearly polarized luminous fluxes separated by the polarized light separating film 631.

The polarized light separating film 631 and the reflecting film 632 are inclined by about 45° with respect to the direction of incoming luminous flux and the direction of outgoing luminous flux in plan view, and are arranged alternately at regular array pitches.

The polarized light separating film 631 is elongated in the direction orthogonal to the reference axis A, and the longitudinal direction is parallel to the direction of displacement between the center C2 of light emission of the light source lamp 11 and the center C1 of the source of reflected light of the secondary reflecting mirror 13. The polarized light separating film 631 is formed of dielectric multi-layer film or the like which is set to about 45° in Brewster angle, and serves to separate the random polarized luminous flux into two types of polarized luminous flux, and reflects a luminous flux having a direction of polarization parallel to the incoming surface of the polarized light separating film 631 (S-polarized luminous flux), and transmits a luminous flux having a direction of polarization orthogonal to the S-polarized luminous flux (P-polarized luminous flux).

The reflecting film 632 is formed of a single metallic material having a high reflective property, such as Al, Au, Ag, Cu, or Cr, or of alloy containing a plurality of types of those metals, and reflects the S-polarized luminous flux reflected from the polarized light separating film 631.

The glass member 633 allows the luminous flux to pass therethrough, and is generally formed by machining a white board glass or the like.

The phase plate 64 is provided on the luminous flux emitting side of the glass member 633 which constitutes the polarized light separating element array 63, and the direction of polarization of the linearly polarized luminous flux, which is one of the two types of luminous fluxes emitted from the polarized light separating element array 63, is rotated by 90° to align with the direction of polarization of the other linearly polarizing luminous flux. More specifically, the phase plate 64 is adhered on the luminous flux emitting end surface of the polarized light separating element array 63 at the portion where the luminous flux passed through the polarized light separating film 631 is emitted, and rotates the direction of polarization of the P-polarized luminous flux passing through the polarized light separating film 631 by 90°.

The light-shielding plate 62 is formed of stainless or Al alloy, and is provided on the luminous flux incoming side of the polarized light separating element array 63. The light-shielding plate 62 includes a plate member 621 provided corresponding to the reflecting film 632 and an opening 622 formed corresponding to the polarized light separating film 631. Accordingly, the light-shielding plate 62 blocks unnecessary light incoming into the reflecting film 632, and transmits only the luminous flux incoming from the second lens array 413 to the polarized light separating film 631.

The operation of the polarized light converting optical system 23 described above will be described.

The luminous flux proceeding to an ineffective area out of the luminous flux emitted from the second lens array 413 is shielded by the plate member 621 of the light-shielding plate 62. However, since the second lens array 413 converges the luminous flux so that the luminous flux enters only the polarized light separating film 631, the light amount shielded by the light-shielding plate 62 is very small.

Therefore, most part of the luminous flux emitted from the second lens array 413 passes through the opening 622 of the light-shielding plate 62 and enters the polarized light converting element 61. Since the incoming luminous flux is a luminous flux having a random direction of polarization, it is separated into the P-polarized luminous flux and the S-polarized luminous flux by the polarized light separating film 631. In other words, the P-polarized luminous flux transmits the polarized light separating film 631, and the S-polarized luminous flux is reflected from the polarized light separating film 631, so that the optical path is converted by about 90°. The S-polarized luminous flux reflected from the polarized light separating film 631 is reflected from the reflecting film 632, and the optical path thereof is converted by about 90° again, so as to proceed in substantially the same or similar direction as the light incoming into the polarized light converting element 61.

Also, the P-polarized luminous flux passed through the polarized light separating film 631 enters the phase plate 64, is rotated in direction of polarization by 90°, and then is emitted as the S-polarized luminous flux.

Accordingly, substantially one type of S-polarized luminous flux is emitted from the polarized light converting element 61, and is imaged on the liquid crystal panel 42 by the superimposing lens 24.

3. Detailed Structure of the Illuminating Optical Device

Figure 6:
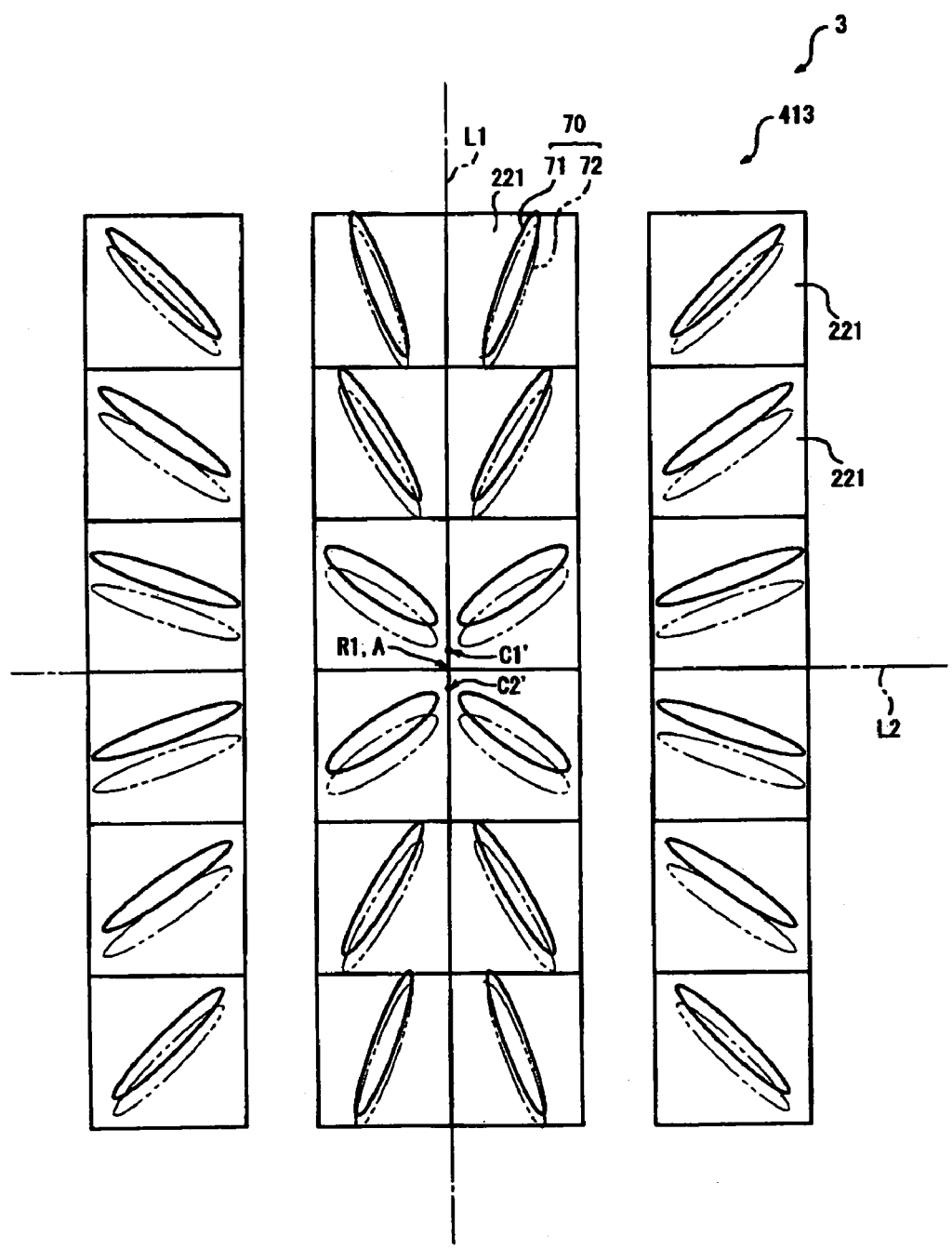
FIG. 6 is a schematic that shows a second lens array according to the exemplary embodiment of the present invention when viewed in the direction along an optical axis.

FIG. 6 is a schematic that shows an arc image 70 which is expected to be formed in the second lens array 413 and the respective small lenses 221 of the second lens array 413 when viewed from the downstream of the optical path along the reference axis A in FIG. 1. The arc image 70 includes the first arc image 71 formed by the luminous flux directly reflected from the elliptic reflector 12 (shown in a solid line in FIG. 6) and the second arc image 72 formed by the luminous flux reflected from the elliptic reflector 12 via the secondary reflecting mirror 13 (shown in a chain double-dashed line in FIG. 6).

The vertical position of the center C2 of light emission of the light source lamp unit 10 with respect to the reference axis A in the plane of the second lens array 413 is represented by a point C2', and the vertical position of the center C1 of the source of reflected light of the secondary reflecting mirror 13 with respect to the reference axis A is represented by a point C1'. A center R1 of the second lens array 413, the point C2', and a point C4' are aligned on a reference line L1 perpendicular to the reference axis A. Also, a reference line L2 is a straight line passing through the center R1 of the second lens array 413 and perpendicular to the reference axis A and the reference line L1.

The first arc images 71 and the second arc images 72 are considered to be formed in the respective small lenses 221 as described below.

The center of the first arc image 71 formed in each small lens 221 is displaced from the optical axes of each small lens 221 in the direction opposite from the direction of displacement of the center C2 of light emission with respect to the first focal point F1. Also, the center of the second arc image 72 formed in each small lens 221 is displaced with respect to the optical axis of each small lens 221 in direction opposite from the direction of displacement of the center C1 of the source of reflected light with respect to the first focal point F1. The optical axis of each small lens 221, the center of the first arc image 71, and the center of the second arc image 72 are disposed on a straight line which extends in parallel to the reference line L1.

The first arc image 71 and the second arc image 72 in each small lens 221 are oval shape substantially elongated in the direction of the straight line connecting the center R1 and the center of the optical axis of each small lens 221. In each small lens 221, the longitudinal direction of the first arc image 71 is parallel to the longitudinal direction of the second arc image 72.

The longitudinal directions of the first arc image 71 and the second arc image 72 are substantially parallel to the reference line L1 in the small lens 221 which is nearer to the reference line L1 and farther from the reference line L2, and the longitudinal directions are substantially perpendicularly to the reference line L1 in the small lens which is farther from the reference line L1 and closer to the reference line L2. In other words, in the second lens array 413, the first arc images 70 are scattered radially about the center R1 in the second lens array 413.

Subsequently, the arc image 70 in the polarized light converting optical system 23 of the luminous flux passed through the second lens array 413 will be described.

Figure 7:
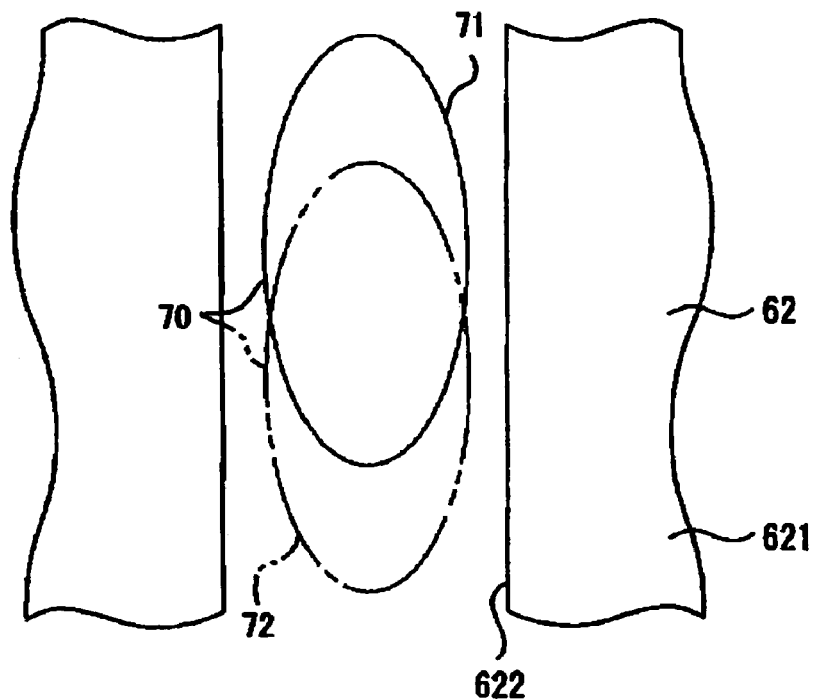
FIG. 7 is a schematic that shows an arc image formed by the light source unit according to the exemplary embodiment of the present invention.
Figure 8:
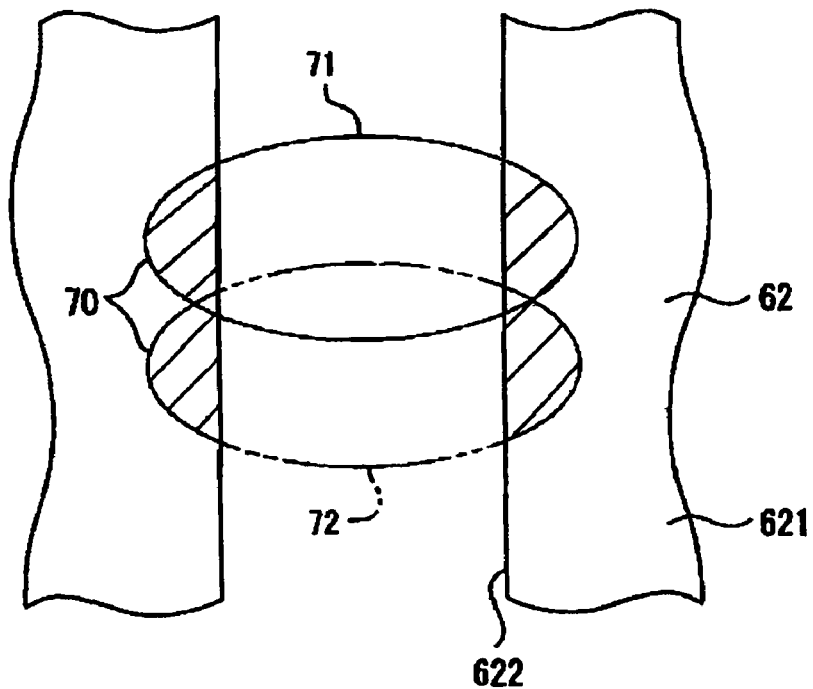
FIG. 8 is a schematic that shows an arc image formed by the light source unit according to the exemplary embodiment of the present invention.

FIG. 7 and FIG. 8 are schematics that show the arc image 70 which is expected to be formed at the opening 622 of the light-shielding plate 62 of the polarized light converting optical system 23.

As described above, since the inclination of the first arc image 71 and the second arc image 72, in the longitudinal direction with respect to the reference line L1, is different depending on the position of the small lens 221 in the second lens array 413, the amount of loss of the light amount of the partial luminous flux when passing through the opening 622 of the polarized light converting optical system 23 is different depending on the position of the small lens 221 through which the corresponding partial luminous flux has passed.

First, the arc image 70 of the luminous flux passed through the small lens 221 which is closer to the reference line L1 and farther from the reference line L2 as shown in FIG. 7 will be described. The longitudinal directions of the first arc image 71 and the second arc image 72 are substantially parallel to the longitudinal direction of the opening 622. The direction of displacement of the center of the second arc image 72 with respect to the center of the first arc image 71 is parallel to the longitudinal direction of the opening 622. Therefore, most part of the arc image 70 passes through the opening 622.

Subsequently, as shown in FIG. 8, the arc image 70 of the luminous flux passed through the small lens 221 which is farther to the reference line L1 and closer to the reference line L2 will be described. Since the longitudinal directions of the first arc image 71 and the second arc image 72 are substantially orthogonal to the longitudinal direction of the opening 622, both end portions in the longitudinal directions of the first arc image 71 and the second arc image 72 are shielded by the plate member 621. Therefore, only the center portion of the arc image 70 passes through the opening 622. However, the direction of displacement of the center of the second arc image 72 with respect to the center of the first arc image 71 is substantially parallel to the longitudinal direction of the opening 622, the amount of portion of the arc image 70 shielded by the plate member 621 varies depending on the length of the arc image in the longitudinal direction irrespective of the amount of displacement between the first arc image 71 and the second arc image 72.

In other words, with the illuminating optical device 3, since the direction of displacement between the center C2 of light emission and the center C1 of the source of reflected light of the secondary reflecting mirror 13 is parallel to the longitudinal direction of the opening 622 of the polarized light converting optical system 23, that is, the longitudinal direction of the polarized light separating film 631, even when the first arc image 71 and the second arc image 72 of the luminous flux emitted from the light source lamp unit 10 are displaced, the light amount of the luminous flux entering the polarized light converting optical system 23 is the same or similar as the case in which the first arc image 71 and the second arc image 72 are not displaced. Therefore, loss of the light amount of the illumination emitted by the illuminating optical device 3 due to displacement between the center C2 of light emission and the center C1 of the source of reflected light of the secondary reflecting mirror 13 is avoided.

It will be described further in detail referring to FIG. 9, FIG. 10, and FIG. 11.

Figure 9:
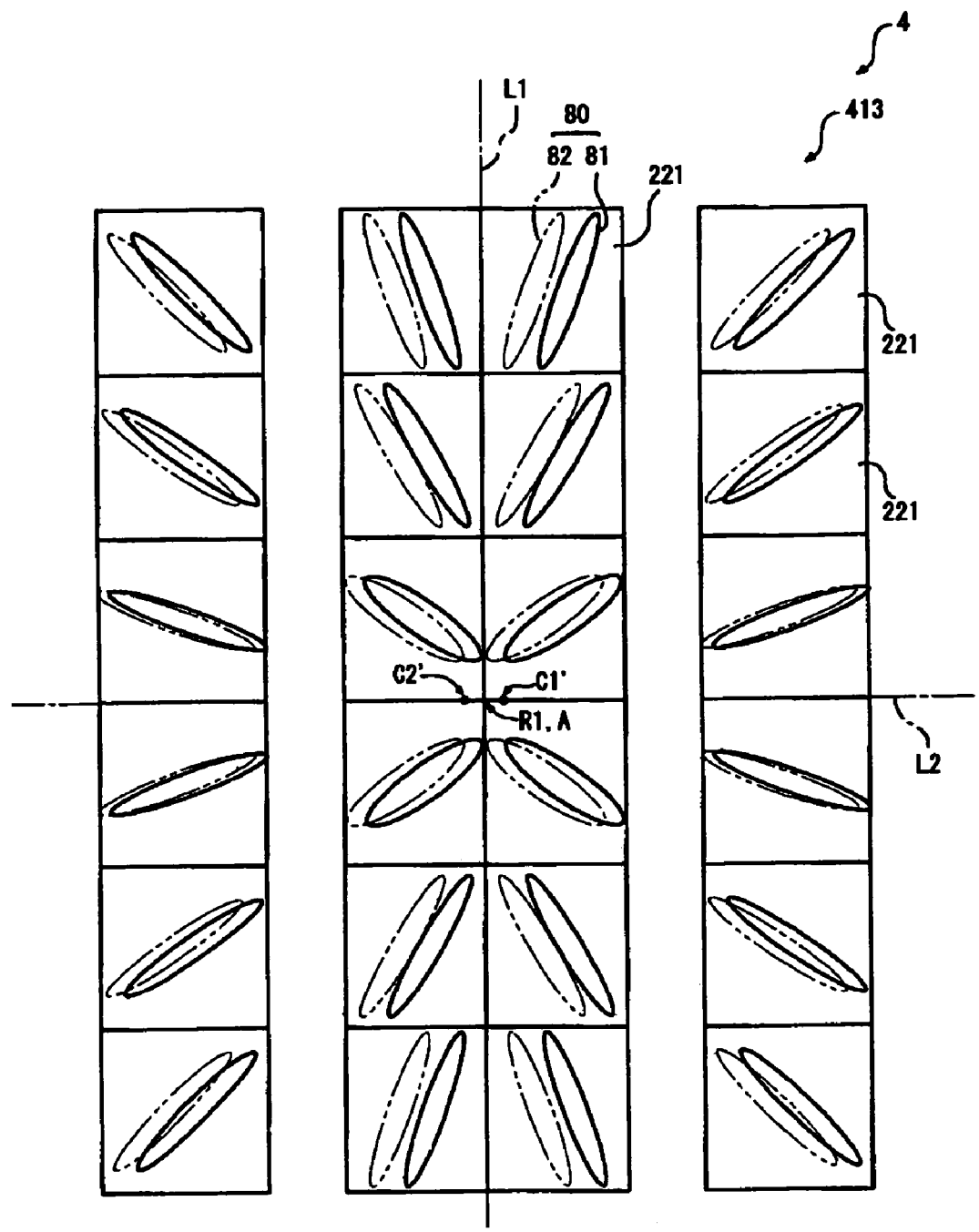
FIG. 9 is a schematic that shows the second lens array according to a comparative example in the exemplary embodiment of the present invention when viewed in the direction along the optical axis.
Figure 10:
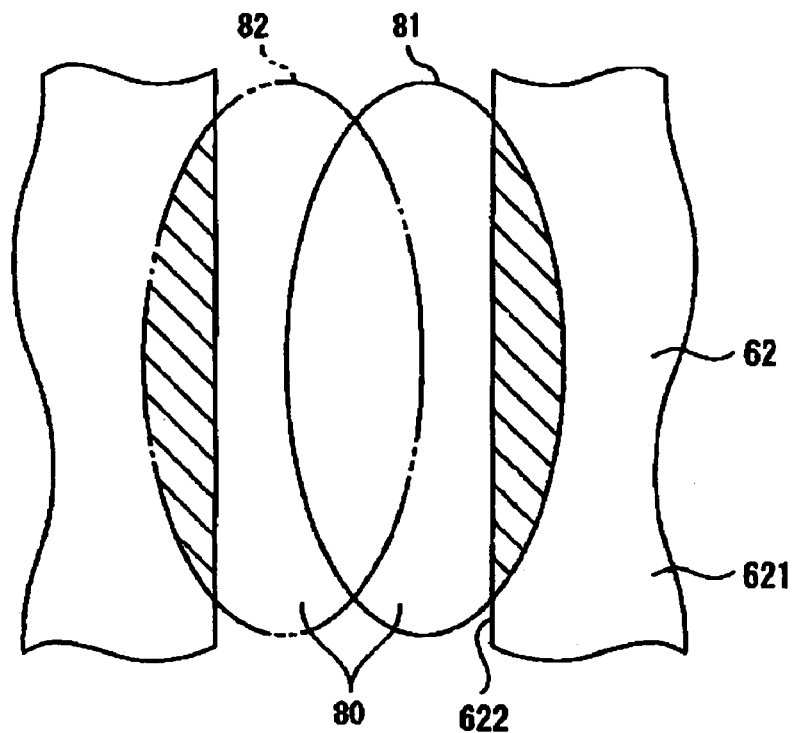
FIG. 10 is a schematic that shows an arc image formed by the light source unit according to the comparative example in the exemplary embodiment of the present invention.
Figure 11:
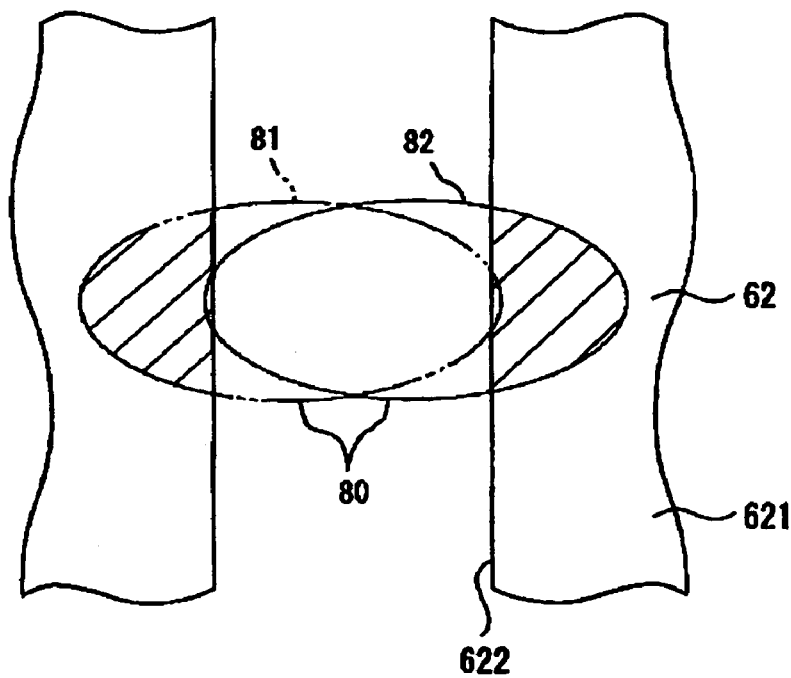
FIG. 11 is a schematic that shows an arc image formed by the light source unit according to the comparative example in the exemplary embodiment of the present invention.

Although the direction of displacement between the center C2 of light emission and the center C1 of the source of reflected light of the secondary reflecting mirror 13 is parallel to the reference line L1 in FIG. 6, in an illuminating optical device 4 shown in FIG. 9, FIG. 10, and FIG. 11, the direction of displacement of the center C2 of light emission and the center C1 of the source of reflected light of the secondary reflecting mirror 13 is the direction orthogonal to the reference line L1. In other words, the direction of displacement of the center C2 of light emission and the center C1 of the source of reflected light of the secondary reflecting mirror 13 is orthogonal to the longitudinal direction of the opening 622 of the polarized light converting optical system 23, that is, the longitudinal direction of the polarized light separating film 631. Therefore, the illuminating optical device 3 and the illuminating optical device 4 are different in that the direction of displacement between the center C2 of light emission and the center C1 of the source of reflected light of the secondary reflecting mirror 13 by 90°. The structure of other parts of the illuminating optical device 4 is the same as the illuminating optical device 3, and the identical components are represented by the identical numerals.

FIG. 9 is a schematic that shows the second lens array 413 and arc images 80 which are expected to be formed in the respective small lenses 221 of the second lens array 413 viewed from the downstream of the optical path along the reference axis A. The arc image 80 includes a first arc image 81 (shown in a solid line in FIG. 9) formed by the luminous flux directly reflected from the elliptic reflector 12, and a second arc image 82 (shown by a chain double-dashed line in FIG. 9) formed by the luminous flux reflected from the elliptic reflector 12 via the secondary reflecting mirror 13. The vertical position of the center C2 of light emission of the light source lamp unit 10 with respect to the reference axis A in the second lens array 413 is represented by the point C2', and the vertical position of the center C1 of the source of reflected light of the secondary reflecting mirror 13 with respect to the reference axis A is represented by the point C1'.

The first arc images 81 and the second arc images 82 are considered to be formed within the respective small lenses 221 as described below.

In FIG. 9, being a different exemplary embodiment from the illuminating optical device 3 in FIG. 6, the center R1 of the second lens array 413, the point C2', and the point C1' are aligned on the reference line L2. The optical axis of each small lens 221, the center of the first arc image 81, and the center of the second arc image 82 are disposed on the straight line orthogonal to the reference line L1.

Subsequently, the arc image 80 of the luminous flux passed through the second lens array 413 in the polarized light converting optical system 23 will be described.

FIG. 10 and FIG. 11 are schematics that show the arc image 80 which is expected to be formed at the opening 622 of the light-shielding plate 62 of the polarized light converting optical system 23.

In the illuminating optical device 4, as in the case of the illuminating optical device 3, since inclination of the longitudinal directions of the first arc image 81 and the second arc image 82 with respect to the reference line L1 varies depending on the position of the small lense 221 in the second lens array 413, the amount of loss of the light amount of the partial luminous flux when passing through the opening 622 of the polarized light converting optical system 23 varies depending on the position of the small lens 221 through which the partial luminous flux passes.

First, as shown in FIG. 10, the arc image 80 of the luminous flux passed through the small lens 221 which is closer to the reference line L1 and farther from the reference line L2 will be described. The longitudinal directions of the first arc image 81 and the second arc image 82 are substantially parallel to the longitudinal direction of the opening 622. However, since the direction of displacement of the center of the second arc image 82 with respect to the center of the first arc image 81 is orthogonal to the longitudinal direction of the opening 622, one of the side end portions in the direction orthogonal to the longitudinal directions of the first arc image 81 and the second arc image 82 is shielded by the plate member 621. Therefore, the portion of the arc image 80 other than the above-described side end portions can pass through the opening 622. The amount of the arc image 80 shielded by the plate member 621 varies depending on the amount of displacement between the first arc image 81 and the second arc image 82, and hence when the amount of displacement between the first arc image 81 and the second arc image 82 increases, the light amount shielded by the plate member 621 increases correspondingly.

Subsequently, the arc image 80 of the luminous flux passed through the small lens 221 which is further from the reference line L1 and closer to the reference line L2 as shown in FIG. 11 will be described. The longitudinal directions of the first arc image 81 and the second arc image 82 are substantially orthogonal to the longitudinal direction of the opening 622, and the side end portions of the first arc image 81 and the second arc image 82 in the longitudinal direction are shielded by the plate member 621. Furthermore, since the direction of displacement of the center of the second arc image 82 with respect to the center of the first arc image 81 is orthogonal to the longitudinal direction of the opening 622, the amount of the portion of the arc image 80 shielded by the plate member 621 varies depending on the amount of displacement between the first arc image 81 and the second arc image 82, and when the amount of displacement between the first arc image 81 and the second arc image 82 increases, the light amount shielded by the plate member 621 increases correspondingly.

In other words, in the illuminating optical device 4, since the direction of displacement between the center C1 of the source of reflected light of the secondary reflecting mirror 13 and the center C2 of light emission of the light emitting lamp 11 is orthogonal to the longitudinal direction of the opening 622 of the polarized light converting optical system 23, that is, the longitudinal direction of the polarized light separating film 631, the light amount of the luminous flux entering the polarized light converting optical system 23 is decreased depending on the amount of displacement between the center C1 of the source of reflected light and the center C2 of light emission. Therefore, when the center C1 of the source of reflected light and the center C2 of light emission are displaced in the direction orthogonal to the longitudinal direction of the polarized light separating film 631, the light amount of the illumination emitted from the illuminating optical device 4 will be lost according to the amount of displacement thereof.

Specific exemplary examples will be described below. When the center C2 of light emission is displaced from the center C1 of the source of reflected light of the secondary reflecting mirror 13 by 20 μm, the amount of displacement between the center of the first arc image 71 and the center of the second arc image 72 will be in the order of 40 μm. In the relative position between the center C2 of light emission and the center C1 of the source of reflected light of the secondary reflecting mirror 13, the illumination intensity of the optical image emitted from the illuminating optical device 4 formed on a screen 65 is lowered in the order of 1.3% than the illumination intensity of the optical image emitted from the illuminating optical device 3.

Therefore, in order to increase the illumination intensity of the optical image on the projecting screen 65, in the illuminating optical device 3, the center C2 of light emission of the light source lamp unit 10 and the center C1 of the source of reflected light of the secondary reflecting mirror 13 are displaced in the direction perpendicular to the reference axis A, and the light source lamp unit 10 and a polarized light converting element 234 are disposed so that the direction of displacement between the center C2 of light emission and the center C1 of the source of reflected light of the secondary reflecting mirror 13 and the longitudinal direction of the polarized light separating film 631 become parallel to each other, so that loss of the light amount emitted from the illuminating optical device 3 is prevented.

4. A Method of Manufacturing Light Source Unit and Illuminating Optical Device

A method of manufacturing the aforementioned light source lamp unit 10 will be described below.

Figure 12:
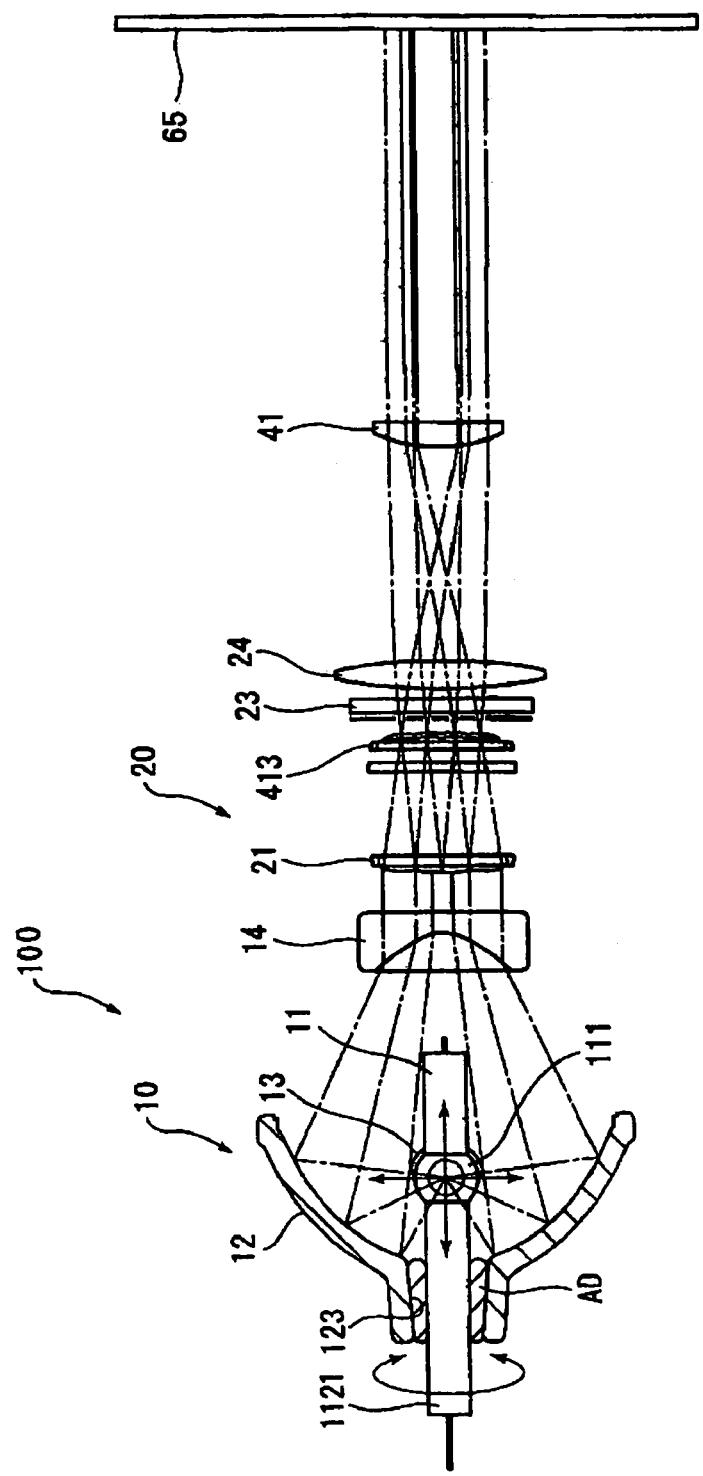
FIG. 12 is a schematic that shows an explanatory diagram of a method of manufacturing the light source unit or the illuminating optical device according to a first exemplary embodiment of the present invention.

As shown in FIG. 12, the light source lamp unit 10 is manufactured using an otpical system 100. The optical system 100 includes the field lens 41, the first lens array 21, the second lens array 413, the polarized light converting optical system 23, and the superimposing lens 24 of the uniformly illuminating optical system 20, and the projecting screen 65 on which an image formed by the second lens array 413 is projected.

(2-A) As shown in FIG. 12, the elliptic reflector 12 is arranged on the luminous flux incoming side of the collimator concave lens 14 in the optical system 100 provided with the collimator lens 14 of the aforementioned light source lamp unit 10, the first lens array 21, the second lens array 413, the polarized light converting optical system 23, the superimposing lens 24, the field lens 41, and the projecting screen 65 on which the image formed by the second lens array 413 is projected disposed on the reference axis A, so that the first focal point and the second focal point of the elliptic reflector 12 are disposed on the reference axis A.

(2-B) Preliminarily fix the secondary reflecting mirror 13 to one of the sealed sections 1122, so that the light emitting section 111 of the light source lamp 11 of the light source lamp unit 10 opposes the reflecting surface of the secondary reflecting mirror 13.

(2-C) Adjust the relative position between the secondary reflecting mirror 13 and the light source lamp 11 while observing reflected images of the electrodes 1141, 1142 reflected from the reflecting surface of the secondary reflecting mirror 13 and the actual electrodes 1141, 142 from a plurality of different directions with the CCD camera or the like, and fixing the secondary reflecting mirror 13 to one of the sealed sections 1122 of the light source lamp 11 with an adhesive agent at the position where the reflected images of the electrodes 1141, 1142 reflected from the reflecting surface of the secondary reflecting mirror 13 are displaced with respect to the actual electrodes 1141, 1142 in the direction perpendicular to the longitudinal direction of the sealed sections 1121, 1122 of the light source lamp 11 is displaced by the amount corresponding to the preset value, for example, in the order of 20 μm.

(2-D) Insert the other sealed section 1121 of the light source lamp 11 into the insertion hole 123 of the elliptic reflector 12 so that the longitudinal direction of the light source lamp 11 becomes parallel to the reference axis A to arrange the light emitting section 111 in the reflecting portion 122 of the elliptic reflector 12 and retaining the light source lamp 11 with a jig or the like.

(2-E) Apply a voltage to the light source lamp 11 to allow it to illuminate, and project the optical image of the arc image 70 on the projecting screen 65 by the light source lamp unit 10.

(2-F) Move the light source lamp 11 in the direction parallel to the reference axis A and in the direction perpendicular to the reference axis A while observing the first arc image 71 and the second arc image 72 formed on the projecting screen 65 and adjust the position of the light source lamp 11 on which the secondary reflecting mirror 13 is fixed with respect to the elliptic reflector 12 so as to obtain the most bright arc image 70.

(2-G) Rotate the light source lamp 11 including the secondary reflecting mirror 13 fixed thereon about the reference axis A while observing the first arc image 71 and the second arc image 72 formed on the projecting screen 65 and adjust the position of the light source lamp 11 including the secondary reflecting mirror 13 fixed thereon with respect to the elliptic reflector 12 so that the direction of displacement between the center of the first arc image 71 and the center of the second arc image 72 becomes parallel to the longitudinal direction of the polarized light separating film 631 of the polarized light converting optical system 23.

(2-H) When the positioning of the light source lamp 11 on which the secondary reflecting mirror 13 is fixed with respect to the elliptic reflector 12 is finished, inject the heat-resistant inorganic adhesive agent AD in the insertion hole 123 and hold the light source lamp 11 with a jig or the like to allow the adhesive agent AD to cure. Accordingly, the light source lamp 11 including the secondary reflecting mirror 13 fixed thereon is fixed to the elliptic reflector 12.

(2-I) Remove the elliptic reflector 12 to which the light source lamp 11 including the secondary reflecting mirror 13 fixed thereon is fixed from the optical system 100, arrange the collimator concave lens 14 so that the luminous flux emitted from the elliptic reflector 12 becomes a luminous flux parallel to the straight line on which the first focal point and the second focal point of the elliptic reflector 12 are disposed, and fix the elliptic reflector 12 and the collimator concave lens 14 so that the relative position between the elliptic reflector 12 and the collimator concave lens 14 is maintained.

By performing the following step of (2-J) after the step of (2-I), the illuminating optical system 3 of the first exemplary embodiment described above may be manufactured.

(2-J) As in the case of the optical system 100, arrange the uniformly illuminating optical system 20 provided in the illuminating optically device 3 with respect to the light source lamp unit 10 so that the direction of displacement between the center of the first arc image 71 and the center of the second arc image 72 becomes parallel to the longitudinal direction of the polarized light separating film 631 of the polarized light converting optical system 23, and fixing the light source lamp unit 10 and the uniformly illuminating optical system 20 so that the relative position between the light source lamp unit 10 and the uniformly illuminating optical system 20 is maintained.

According to the first exemplary embodiment as described above, the following effects are addressed or achieved.

(1-1) On the straight line perpendicular to the reference axis A passing between the first focal point F1 and the second focal point F2 of the elliptic reflector 12, since the center C2 of light emission of the light source lamp 11 and the center C1 of the source of reflected light of the secondary reflecting mirror 13 are displaced in the range in which the luminous flux can effectively enter the collimator concave lens 14, the luminous flux reflected from the secondary reflecting mirror 13 can proceed to the elliptic reflector 12 while being hardly subjected to the plasma absorption by the arc source generated between the electrodes 1141, 1142, whereby the illumination intensity of the second arc image 72 formed by being reflected from the elliptic reflector 12 via the secondary reflecting mirror 13 may be improved.

(1-2) Since arrangement is made so that the first focal point F1 of the elliptic reflector 12, the center C2 of light emission, and the center C1 of the source of reflected light of the secondary reflecting mirror 13 are disposed on the straight line perpendicular to the reference axis A passing through the first focal point F1 and the second focal point F2 of the elliptic reflector 12, and the first focal point F1 of the elliptic reflector 12 is disposed between the center C2 of light emission and the center C1 of the source of reflected light of the secondary reflecting mirror 13, the luminous flux can be converged at the position in the vicinity of the second focal point of the elliptic reflector 12, and the illumination intensity of the luminous flux emitted from the light source lamp unit 10 may be improved.

(1-3) The illuminating optical device 3 is disposed so that the direction of displacement between the center C2 of light emission of the light source lamp unit 10 and the center C1 of the source of reflected light of the secondary reflecting mirror 13 is parallel to the longitudinally direction of the polarized light separating film 631 of the polarized light converting optical system 23, loss of the light amount of illumination caused by displacement between the center C2 of light emission and the center C1 of the source of reflected light may be prevented, so that illumination with higher illumination intensity may be emitted.

(1-4) Since the first focal point F1 of the elliptic reflector 12 disposed between the center C1 of the source of reflected light of the secondary reflecting mirror 13 and the center C2 of light emission of the light source lamp 11 is arranged at the position closer to the center C2 of light emission than to the center C1 of the source of reflected light, the first arc image 71 formed by light from the center C2 of light emission, which has more light amount than the center C1 of the source of reflected light, can be formed closer to the second focal point F2 of the elliptic reflector 12 disposed on the reference axis A to allow a larger amount of the first arc image 71 having more light amount to enter the polarized light separating film 631 of the polarized light converting device 23, and hence the illuminating intensity of the illumination emitted from the illuminating optical device 3 may further be enhanced or improved.

(2-1) Since the secondary reflecting mirror 13 is mounted to the light source lamp 11 so that the electrodes 1141, 1142 of the light source lamp 11 and the reflected images of the electrodes 1141, 1142 reflected by the reflecting surface of the secondary reflecting mirror 13 are displaced by a preset amount, the luminous flux emitted from the center C2 of light emission of the light source lamp 11 and reflected to the secondary reflecting mirror 13 does not pass the center C2 of light emission again, and hence the absorbed amount of luminous flux due to a plasma absorption phenomenon generated at the center C2 of light emission may be decreased, so that the light source lamp unit 10 which can control lowering of the illumination intensity of the second arc image 72 formed by being reflected from the elliptic reflector 12 via the secondary reflecting mirror 13 can easily be manufactured.

(2-2) Since the position of the light source lamp 11 with respect to the elliptic reflector 12 is adjusted in the direction parallel to the reference axis A and in the direction perpendicular to the reference axis A while observing the first arc image 71 and the second arc image 72 projected on the projecting screen 65 so that the brightness of the first arc image 71 and the second arc image 72 is maximized, and the position of the light source lamp 11 with respect to the elliptic reflector 12 is adjusted so that the direction of displacement between the center of the first arc image 71 and the center of the second arc image 72 is parallel to the longitudinal direction of the polarized light separating film 631 of the polarized light converting optical system 23, the light source lamp unit 10 which can emit illumination of high illumination intensity may be manufactured with high degree of accuracy.

(2-3) Since the light source lamp unit 10 is manufactured using the optical system 100 provided with the uniformly illuminating optical system 20, loss of the light amount of illumination caused by displacement between the center of the first arc image 71 and the second arc image may be prevented simply by disposing the uniformly illuminating optical system 20 provided in the illuminating optical device 3 with respect to the light source lamp unit 10 as in the case of the optical system 100, whereby the illuminating optical device 3 for emitting illumination of higher illumination intensity may be manufactured easily.

(2-4) Since the relative position between the elliptic reflector 12 and the light source lamp 11 including the secondary reflecting mirror 13 fixed thereon is adjusted so that the direction of displacement between the center of the first arc image 71 and the center of the second arc image 72 is parallel to the longitudinal direction of the polarized light separating film 631 of the polarized light converting optical system 23 by mounting the secondary reflecting mirror 13 to the light source lamp 11 and rotating the light source lamp 11, what is necessary is simply to rotate the light source lamp 11 in the process of adjustment but not to change the posture of the elliptic reflector 12, and hence the light source lamp unit 10 which can emit illumination of high illumination intensity can easily be manufactured. Since it is not necessary to change the posture of the elliptic reflector 12 in the process of adjustment, the shape of the elliptic reflector 12 may be a shape which cannot be rotated easily, such as the square shape in cross-section of the portion in the vicinity of the opening, and hence the range of versatility is enhanced or increased.

[Second Exemplary Embodiment]

According to the aforementioned first exemplary embodiment, the light source lamp unit 10 is manufactured using the optical system 100. However, according to the present exemplary embodiment, the light source lamp unit 10 is manufactured using an optical system 200.

Figure 13:
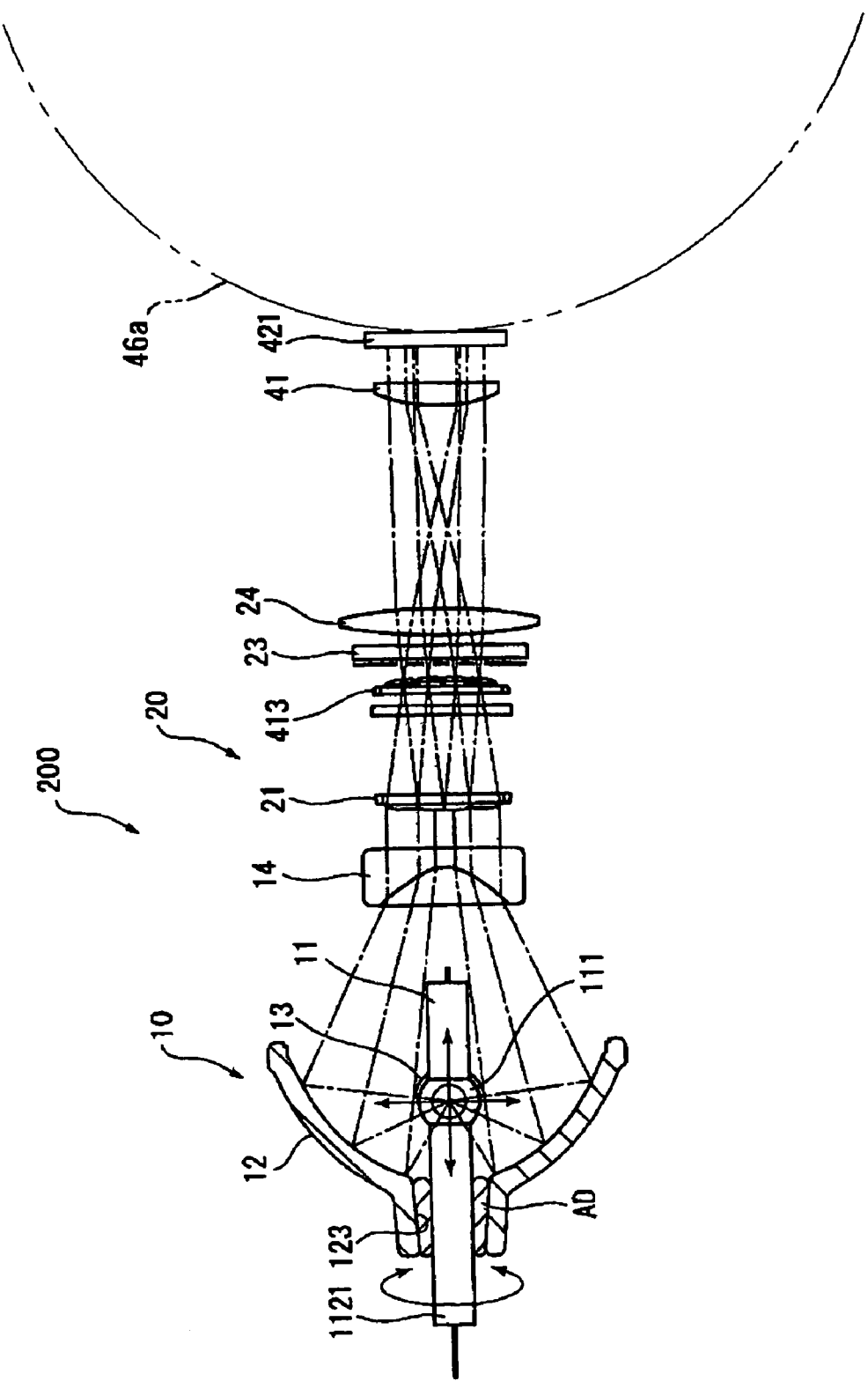
FIG. 13 is a schematic that shows a method of manufacturing the light source unit or the illuminating optical device according to a second exemplary embodiment of the present invention.
Figure 14:
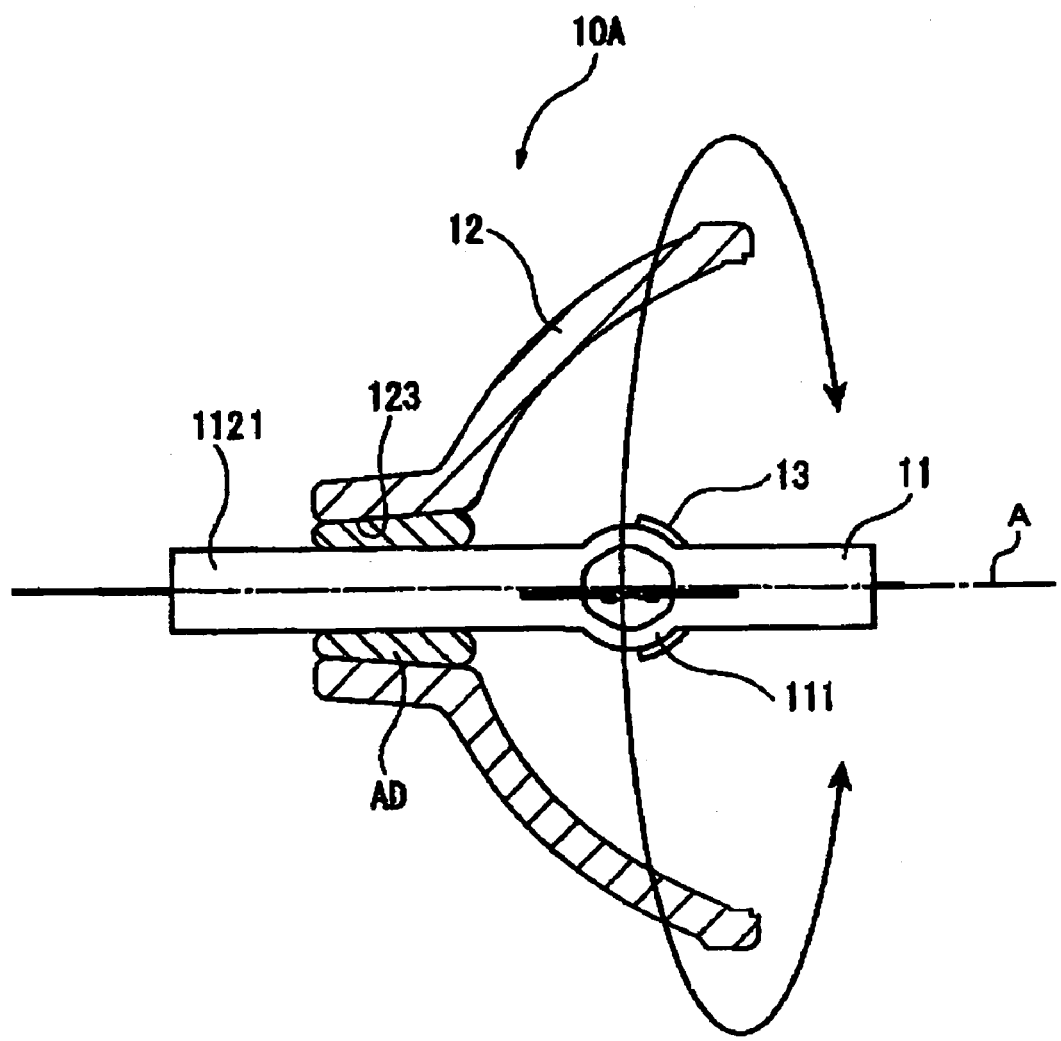
FIG. 14 is a schematic that shows a method of manufacturing the light source unit according to a third exemplary embodiment of the present invention.

According to the present exemplary embodiment, as shown in FIG. 13, the light source lamp unit 10 is manufactured according to the aforementioned first exemplary embodiment using the optical system 200 including the field lens 41, the first lens array 21, the second lens array 413, the polarized light converting optical system 23, the superimposing lens 24 of the uniformly illuminating optical system 20, which are used in the first exemplary embodiment described above, and a frame member 421 disposed on the luminous flux emitting side of the field lens and having an opening in the same shape as the shape of the range of the illuminating area which is the object to be illuminated by the luminous flux emitted from the light source lamp unit 10, and an illuminance meter having an integrating sphere 65a for measuring the illumination intensity of the luminous flux emitted from the opening of the frame member 421.

In the aforementioned first exemplary embodiment, the position of the light source lamp 11 with respect to the elliptic reflector 12 is adjusted while observing the arc image 70 formed on the projecting screen 65 of the optical system 100. However, in the present exemplary embodiment, the position of the light source lamp 11 with respect to the elliptic reflector 12 is adjusted while measuring the illumination intensity of the luminous flux emitted from the opening of the frame member 421 of the optical system 200 while by the integrating sphere 65a using the illuminance meter.

In the present exemplary embodiment, the projecting lens 50 may be disposed between the frame member 421 and the integrating sphere 65a.

A method of manufacturing the light source unit and the illuminating optical device according to the present exemplary embodiment will be described.

(3-A) Arrange the elliptic reflector 12 on the luminous flux incoming side of the collimator concave lens 14 so that the first focal point and the second focal point of the elliptic reflector 12 are disposed on the reference axis A in the optical system 200 including the collimator concave lens 14, the first lens array 21, the second lens array 413, the polarized light converting optical system 23, the superimposing lens 24, the field lens 41, the frame member 421 and the spherical sphere for measuring the illumination intensity of the luminous flux emitted from the frame member 421 arranged on the reference axis A.

(3-B) In the same manner as the steps of (2-B)–(2-D) in the aforementioned first exemplary embodiment, hold the light source lamp 11 which is fixed the secondary reflecting mirror 13 positioned with respect to the light source lamp 11 so that the light emitting section 111 is disposed in a reflecting portion 112 of the elliptic reflector 12.

(3-C) Adjust the position of the light source lamp 11 including the secondary reflecting mirror 13 fixed thereon with respect to the elliptic reflector 12 by moving the light source lamp 11 in the direction parallel to the reference axis A and in the direction of a plane perpendicular to the reference axis A while measuring the illumination intensity of the luminous flux emitted from the opening of the frame member 421 by the integrating sphere 65a so that the value of the illumination intensity measured by the integrating sphere 65a becomes higher.

(3-D) Adjust the position of the light source lamp 11 including the secondary reflecting mirror 13 fixed thereon with respect to the elliptic reflector 12 by rotating the light source lamp 11 about the reference axis A while measuring the illumination intensity of the luminous flux emitted from the opening of the frame member 421 by the integrating sphere 65a, so that the value of the illumination intensity measured by the integrating sphere 65a becomes higher.

(3-E) When the position of the light source lamp 11 including the secondary reflecting mirror 13 fixed thereon with respect to the elliptic reflector 12 is adjusted, inject the heat resistant inorganic adhesive agent AD into the insertion hole 123 and allow the adhesive agent AD to cure. Accordingly, fix the light source lamp 11 including the secondary reflecting mirror 13 fixed thereon to the elliptic reflector 12.

(3-F) In the same manner as the step in (2-I) in the aforementioned first exemplary embodiment, fix the elliptic reflector 12 and the collimator concave lens 14 so that the relative position between the elliptic reflector 12 and the collimator concave lens 14 is maintained in a state in which the luminous flux emitted from the elliptic reflector 12 proceeds in parallel to the straight line on which the first focal point and the second focal point of the elliptic reflector 12 are disposed.

By performing the following step of (3-G) after the steps of (3-F) discussed above, the illuminating optical device 3 of the first exemplary embodiment described above may be manufactured.

(3-G) Arrange the uniformly illuminating optical system 20 provided in the illuminating optical device 3 with respect to the light source lamp unit 10 in the same manner as the optical system 200, and fix the light source lamp unit 10 and the uniformly illuminating optical system 20 so that the relative position between the optical lamp unit 10 and the uniformly illuminating optical system 20 is maintained.

According to the second exemplary embodiment as described above, in addition to the same effects as in (2-1) described in conjunction with the second exemplary embodiment, the following effects are achieved.

(3-1) Since the position of the light source lamp 11 including the secondary reflecting mirror 13 fixed thereon is adjusted with respect to the elliptic reflector 12, so that the higher illumination intensity of the luminous flux emitted from the opening of the frame member 421 in the same shape as the shape of the illuminating area which is the object to be illuminated by the luminous flux emitted from the light source lamp unit 10 is addressed or achieved, the light source lamp unit 10 which emits illumination of higher illumination intensity to the illuminating area which is the object to be illuminated by the light source lamp unit 10 may be manufactured easily.

(3-2) Since the light source lamp unit 10 is manufactured using the optical system 200 provided with the uniformly illuminating optical system 20, loss of the light amount of illumination caused by displacement between the center of the first arc image 71 and the second arc image may be prevented simply by disposing the uniformly illuminating optical system 20 provided in the illuminating optical device 3 with respect to the light source lamp unit 10 as in the case of the optical system 200, and hence the illuminating optical device 3 which can emit illumination of higher illumination intensity, may be manufactured easily.

(3-3) Since the position of the light source lamp 11 including the secondary reflecting mirror 13 fixed thereon with respect to the elliptic reflector 12 is adjusted by mounting the secondary reflecting mirror 13 to the light source lamp 11 and rotating the light source lamp 11 so that the illumination intensity of the luminous flux emitted from the opening of the frame member 421 becomes higher, what is necessary to do for adjustment is simply to rotate the light source lamp 11 and it is not necessary to change the posture of the elliptic reflector 12, the light source lamp unit 10 for emitting the illumination of high illumination intensity may be manufactured easily. In addition, since it is not necessary to change the posture of the elliptic reflector 12 in the process of adjustment, the shape of the elliptic reflector 12 may be the shape which can hardly be rotated, such as the shape being square in cross-section at the portion near the opening, whereby versatility is increased.

[Third Exemplary Embodiment]

In the method of manufacturing the light source lamp unit 10 and the illuminating optical device 3 in the first exemplary embodiment and the second exemplary embodiment described above, the position of the light source lamp 11 including the secondary reflecting mirror 13 fixed thereon with respect to the elliptic reflector 12 is adjusted by rotating the light source lamp 11 including the secondary reflecting mirror 13 fixed thereon with respect to the elliptic reflector 12 so that the direction of displacement between the center of the first arc image 71 and the second arc image is parallel to the longitudinal direction of the polarized light separating film 631 of the polarized light converting optical system 23. However, according to the present exemplary embodiment, the position of the light source lamp 11 including the secondary reflecting mirror 13 fixed thereon with respect to the elliptic reflector 12 is adjusted by rotating the elliptic reflector together with the light source lamp 11 including the secondary reflecting mirror 13 fixed thereon so that the direction of displacement between the center of the first arc image 71 and the second arc image is in parallel to the longitudinal direction of the polarized light separating film 631 of the polarized light converting optical system 23.

A method of manufacturing the light source lamp unit 10 and the illuminating optical device 3 in the first embodiment using the aforementioned optical system 100 in the first exemplary embodiment and the optical system 200 in the second exemplary embodiment will be described below.

(4-A) As in the steps of (2-A)–(2-F) in the first embodiment and the steps of (3-A)–(3-C) in the second embodiment described above, arrange the elliptic reflector 12 in the optical system 100 or 200, position and fix the secondary reflecting mirror 13 with respect to the light source lamp 11, and adjust the position of the light source lamp 11 including the secondary reflecting mirror 13 fixed thereon by moving the light source lamp 11 with respect to the elliptic reflector 12 in the direction parallel to the reference axis A and in the direction perpendicular to the reference axis A.

(4-B) Inject the heat resistant inorganic adhesive agent AD in the insertion hole 123 of the elliptic reflector 12, and hold the light source lamp 11 with the jig or the like to allow the adhesive agent AD to cure. Accordingly, mount the light source lamp 11 including the secondary reflecting mirror 13 fixed thereon to the elliptic reflector 12.

(4-C) When manufacturing using the optical system 100, adjust the position of the light source lamp 11 including the secondary reflecting mirror 13 fixed thereon with respect to the elliptic reflector 12 by rotating the elliptic reflector 12 about the reference axis A (that is, the straight line passing through the first focal point F1 and the second focal point F2) while observing the first arc image 71 and the second arc image 72 formed on the projecting screen 65 so that the direction of displacement between the center of the first arc image 71 and the center of the second arc image 72 is parallel to the longitudinal direction of the polarized light separating film 631 of the polarized light converting optical system 23.

When manufacturing using the optical system 200, adjust the position by rotating the elliptic reflector 12 about the reference axis A in the same manner as described above while measuring the illumination intensity of the luminous flux emitted from the opening of the frame member 421 by the integrating sphere 65a so that the higher value of the illumination intensity measured by the integrating sphere 65a is achieved.

(4-D) As in the step of (2-I) in the aforementioned first exemplary embodiment, fix the elliptic reflector 12 and the collimator concave lens 14 so that the relative position between the elliptic reflector 12 and the collimator concave lens 14 can be maintained in a state in which the luminous flux emitted from the elliptic reflector 12 proceeds in parallel to the straight line on which the first focal point and the second focal point of the elliptic reflector 12 are disposed.

By performing the following step of (2-J) in the first exemplary embodiment or (3-G) in the second exemplary embodiment after the step of (4-D), the illuminating optical device 3 of the first exemplary embodiment described above may be manufactured.

According to the third exemplary embodiment as described above, the same effects as (2-1)–(2-3), (3-1), and (3-3) described in the first exemplary embodiment and the second exemplary embodiment are achieved.

The present invention is not limited to the aforementioned exemplary embodiments, and exemplary modifications and improvements within the range in which the object of the present invention can be achieved are included in the present invention.

For example, although the secondary reflecting mirror 13 is mounted to the light source lamp 11 in the aforementioned exemplary embodiments, it is not limited thereto, and the secondary reflecting mirror may be formed by depositing a reflecting material on the front surface of the light source lamp. In this arrangement, the secondary reflecting mirror can be formed easily and hence the light source lamp unit 10 can be manufactured easily.

Although only the example of the projector 1 using the three liquid crystal panels 42R, 42G, 42B is shown in the aforementioned exemplary embodiment, the present invention may be applied to a projector using only one liquid crystal panel, a projector using two liquid crystal panels or a projector using four or more liquid crystal panels.

Although the liquid crystal panel in which translucency on the light incoming surface is different from that on the light emitting surface is used in the aforementioned exemplary embodiment, a liquid crystal panel of reflecting type having the identical translucency on the light incoming surface and the light emitting surface may be employed.

Although the liquid crystal panel is used as the optical modulating unit in the aforementioned exemplary embodiments, optical modulating units other than liquid crystal type, such as a device using a micro mirror, may be employed. In this case, the polarizing plates on the luminous flux incoming side and the luminous flux emitting side may be omitted.

Although only the example of the front-type projector which projects from the direction to view the screen is shown in the aforementioned exemplary embodiment, the present invention may be applied to the rear-type projector which projects in the opposite direction from the direction to view the screen.

Although the light source lamp unit or the illuminating optical device according to aspects of the present invention is employed in the projector in the aforementioned exemplary embodiments, aspects of the present invention are not limited thereto, and the light source lamp unit or the illuminating optical device of the present invention may be applied to other types of optical apparatuses.

Other detailed structures and shapes for implementing the present invention may be employed within the range in which the object of the present invention may be achieved.

What is claimed is:

1. A light source unit, comprising:
   an arc tube having a light emitting section in which discharging emission is performed between electrodes;
   a first reflecting mirror to emit a luminous flux radiated from the arc tube in a certain uniform direction; and
   a second reflecting mirror provided on an opposite side of the light emitting section from the first reflecting mirror, the first reflecting mirror including a reflecting surface in the form of an elliptic curved surface, the reflecting surface of the first reflecting mirror having a first focal point and a second focal point, a center of discharging emission between the electrodes not matching the first focal point of the first reflecting mirror, a center of the source of reflected light from the second reflecting mirror, formed by the luminous flux emitted from the center of discharging emission between the electrodes and reflected from the second reflecting mirror, not matching the center of light emission between the electrodes and the first focal point of the first reflecting mirror, and the center of discharging emission between the electrodes, the first focal point of the first reflecting mirror, and the center of the source of reflected light from the second reflecting mirror, being aligned on a straight line perpendicular to a straight line connecting the first focal point and the second focal point of the first reflecting mirror.

2. A light source unit according to claim 1, the first focal point of the first reflecting mirror being disposed on the straight line perpendicular to the straight line connecting the first focal point and the second focal point of the first reflecting mirror between the center of discharging emission between the electrodes and the center of the source of reflected light of the second reflecting mirror.

3. A light source unit according to claim 1, the first focal point of the first reflecting mirror being arranged at a position closer to the center of discharging emission between the electrodes than to the center of the source of reflected light from the second reflecting mirror.

4. A light source unit according to claim 1, the second reflecting mirror being formed by depositing a reflecting material on a front surface of the light emitting section.

5. An illuminating optical device, comprising:
   a light source unit having an arc tube having a light emitting section in which discharging emission is performed between electrodes,
   a first reflecting mirror to emit a luminous flux radiated from the arc tube in a certain uniform direction, and
   a second reflecting mirror provided on an opposite side of the light emitting section from the first reflecting mirror; and a polarized light converting optical system to emit the luminous flux emitted from the light source unit as one type of linearly polarized optical flux in a certain uniform direction, the polarized light converting optical system comprising:
      a plurality of elongated polarized light separating films to separate an incoming luminous flux into two linearly polarized luminous fluxes; and
      a plurality of reflecting films interposed between the polarized light separating films, the light source unit being the light source unit according to claim 1 and a direction of displacement between the center of discharging emission between the electrodes and the center of the source of reflected light from the secondary reflecting mirror is parallel to a longitudinal direction of the polarized light separating films.

6. A illuminating optical device unit according to claim 5, the first focal point of the first reflecting mirror being disposed on the straight line perpendicular to the straight line connecting the first focal point and the second focal point of the first reflecting mirror between the center of discharging emission between the electrodes and the center of the source of reflected light from the second reflecting mirror.

7. A illuminating optical device unit according to claim 5, the first focal point of the first reflecting mirror being arranged at a position closer to the center of discharging emission between the electrodes than to the center of the source of reflected light from the second reflecting mirror.

8. A illuminating optical device unit according to claim 5, the second reflecting mirror being formed by depositing a reflecting material on the front surface of the light emitting section.

9. A projector, comprising:
   the light source unit according to claim 1.

10. A projector unit according to claim 9, the first focal point of the first reflecting mirror being disposed on the straight line perpendicular to the straight line connecting the first focal point and the second focal point of the first reflecting mirror between the center of discharging emission between the electrodes and the center of the source of reflected light from the second reflecting mirror.

11. A projector unit according to claim 9, the first focal point of the first reflecting mirror being arranged at the position closer to the center of discharging emission between the electrodes than to the center of the source of reflected light from the second reflecting mirror.

12. A projector unit according to claim 9, the second reflecting mirror being formed by depositing a reflecting material on the front surface of the light emitting section.

13. A projector, comprising:
   the illuminating optical device according to claim 5.

14. A projector unit according to claim 13, the first focal point of the first reflecting mirror being disposed on the straight line perpendicular to the straight line connecting the first focal point and the second focal point of the first reflecting mirror between the center of discharging emission between the electrodes and the center of the source of reflected light from the second reflecting mirror.

15. A projector unit according to claim 13, the first focal point of the first reflecting mirror being arranged at the position closer to the center of discharging emission between the electrodes than to the center of the source of reflected light from the second reflecting mirror.

16. A projector unit according to claim 13, the second reflecting mirror being formed by depositing a reflecting material on the front surface of the light emitting section.

17. A method of manufacturing a light source unit, comprising:
- an arc tube having a light emitting section in which discharging emission is performed between electrodes, a first reflecting mirror to emit a luminous flux radiated from the arc tube in a certain uniform direction, and a second reflecting mirror provided on the opposite side of the light emitting section from the first reflecting mirror, comprising the steps of:
- adjusting a position of the second reflecting mirror with respect to the arc tube so that the electrodes and a reflected image of the electrodes reflected from the second reflecting mirror are displaced;
- fixing the second reflecting mirror, adjusted in position with respect to the arc tube, to the arc tube;
- arranging the first reflecting mirror so that a first focal point and a second focal point of the first reflecting mirror are disposed on a reference axis on a luminous flux incoming side of a collimator lens of an optical system, the optical system including the collimator lens, a luminous flux splitting optical element, an imaging element, a polarized light converting optical system and a projecting screen disposed on the reference axis, the collimator lens to make parallel the luminous flux radiated from the arc tube disposed on the reference axis, the luminous flux splitting optical element to split the luminous flux emitted from the collimator lens into a plurality of partial luminous fluxes, the imaging element to image the luminous flux split by the luminous flux splitting optical element at a predetermined position, the polarized light converting optical system provided with an elongated polarized light separating film to align the polarizing direction of the respective partial luminous fluxes split by the luminous flux splitting optical element into a certain uniform direction, and the projecting screen on which an image formed by the imaging element is projected;
- illuminating the arc tube provided with the second reflecting mirror; and
- projecting a first arc image formed by the luminous flux radiated from the light emitting section and reflected directly from the first reflecting mirror and a second arc image formed by the luminous flux radiated from the light emitting section and reflected from the first reflecting mirror via the second reflecting mirror, on the projecting screen;
- adjusting the position of the arc tube, on which the second reflecting mirror is fixed, with respect to the first reflecting mirror in the direction parallel to the reference axis and in a direction perpendicular to the reference axis so that the brightness of the first arc image and the second arc image projected on the projecting screen are maximized;
- adjusting the position of the arc tube on which the second reflecting mirror is fixed with respect to the first reflecting mirror by rotating the arc tube with respect to the first reflecting mirror so that the direction of displacement between the center of the first arc image and the center of the second arc image is in the direction parallel to the longitudinal direction of the polarized light separating films; and
- fixing the arc tube adjusted in position with respect to the first reflecting mirror to the first reflecting mirror.

18. A method of manufacturing a light source unit comprising an arc tube having a light emitting section in which discharging emission is performed between electrodes, a first reflecting mirror to emit a luminous flux radiated from the arc tube in a certain uniform direction, and a second reflecting mirror provided on the opposite side of the light emitting section from the first reflecting mirror, comprising the steps of:
- adjusting the position of the second reflecting mirror with respect to the arc tube so that the electrodes and the reflected image of the electrodes reflected from the second reflecting mirror are displaced;
- fixing the second reflecting mirror, which is adjusted in position with respect to the arc tube, to the arc tube;
- disposing the first reflecting mirror on the luminous flux incoming side of a collimator lens of an optical system so that the first focal point and the second focal point of the first reflecting mirror are disposed on the reference axis, the optical system including the collimator lens, a luminous flux splitting optical element, an imaging element, a polarized light converting optical system, a superimposing lens, a frame and the illuminance meter disposed on the reference axis, the collimator lens to make parallel the luminous flux radiated from the arc tube, the luminous flux splitting optical element to split the luminous flux emitted from the collimator lens into a plurality of partial luminous fluxes, the imaging element to image the luminous fluxes split by the luminous flux splitting optical element at a predetermined position, the polarized light converting optical system provided with an elongated polarized light separating film to align the polarizing direction of the respective partial luminous fluxes split by the luminous flux splitting optical element into a certain uniform direction, the superimposing lens to superimpose the luminous flux emitted from the polarized light converting optical system onto an illuminating area which is the object to be illuminated by the light source device, the frame member having an opening of a shape corresponding to the range of illuminating area, and the illuminance meter to measure the illumination intensity of the luminous flux emitted from the opening of the frame member;
- adjusting a position of the arc tube including the second reflecting mirror fixed thereon with respect to the first reflecting mirror in the direction parallel to a reference axis and in the direction perpendicular to the reference axis so that the illumination intensity of the luminous flux emitted from the opening of the frame member becomes higher while applying a voltage to the arc tube to allow it to illuminate and measuring the illumination intensity of the luminous flux emitted from the opening of the frame member with the illuminance meter;
- adjusting the position of the arc tube including the second reflecting mirror fixed thereon with respect to the first reflecting mirror by rotating the arc tube with respect to the first reflecting mirror so that the illumination intensity of the luminous flux emitted from the opening of the frame member becomes higher while measuring the illumination intensity of the luminous flux emitted from the opening of the frame member with the illuminance meter; and
- fixing the arc tube on which the second reflecting mirror positioned with respect to the first reflecting mirror is fixed to the first reflecting mirror.

* * * * *